(12) United States Patent
Lavely et al.

(10) Patent No.: US 11,340,179 B2
(45) Date of Patent: May 24, 2022

(54) NANOFABRICATED STRUCTURES FOR SUB-BEAM RESOLUTION AND SPECTRAL ENHANCEMENT IN TOMOGRAPHIC IMAGING

(71) Applicant: BAE Systems Information and Electronic Systems Integration Inc., Nashua, NH (US)

(72) Inventors: Eugene M. Lavely, Concord, MA (US); Amrita V. Masurkar, Burlington, MA (US); Thomas J. Stark, Manchester, NH (US)

(73) Assignee: BAE Systems Information and Electronic System Integration Inc., Nashua, NH (US)

( * ) Notice: Subject to any disclaimer, the term of this patent is extended or adjusted under 35 U.S.C. 154(b) by 52 days.

(21) Appl. No.: 17/076,303

(22) Filed: Oct. 21, 2020

(65) Prior Publication Data

US 2021/0116400 A1 Apr. 22, 2021

Related U.S. Application Data

(60) Provisional application No. 62/923,756, filed on Oct. 21, 2019.

(51) Int. Cl.
*G01N 23/00* (2006.01)
*G01N 23/2251* (2018.01)

(52) U.S. Cl.
CPC ... *G01N 23/2251* (2013.01); *G01N 2223/079* (2013.01); *G01N 2223/3306* (2013.01);
(Continued)

(58) Field of Classification Search
CPC .......... G01N 23/2251; G01N 23/2252; G01N 2223/079; G01N 2223/418;
(Continued)

(56) References Cited

U.S. PATENT DOCUMENTS 4,169,228 A 9/1979 Briska et al.
5,442,438 A 8/1995 Batchelder et al.
(Continued)

FOREIGN PATENT DOCUMENTS

EP 2599103 B1 3/2017

OTHER PUBLICATIONS

Martin Storath, Andreas Weinmann, Jurgen Frikel, and Michael Unser. Joint image reconstruction and segmentation using the potts model. Inverse Problems, 31(2): 025003, 2015.
(Continued)

*Primary Examiner* — Jurie Yun
(74) *Attorney, Agent, or Firm* — Scott J. Asmus; Finch & Maloney PLLC

(57) ABSTRACT

Techniques are provided for tomographic imaging with sub-beam resolution and spectral enhancement. A system implementing the techniques according to an embodiment includes a target structure comprising one or more selected materials nanopatterned on a first surface of the target structure in a selected arrangement. The system also includes a primary particle beam source to provide a particle beam incident on an area of the first surface of the target structure, the area encompassing one or more of the nanopatterned materials, such that the materials generate characteristic X-rays in response to the primary beam. The system further includes a spectral energy detector (SED) to perform individual photon counting and spectral analysis of the characteristic X-rays and estimate attenuation properties of the imaged sample. The sample is positioned both adjacent to a second surface of the target structure, opposite the first surface, and between the target structure and the SED.

20 Claims, 8 Drawing Sheets

(52) U.S. Cl.
CPC ... *G01N 2223/40* (2013.01); *G01N 2223/418* (2013.01); *G01N 2223/507* (2013.01); *G01N 2223/611* (2013.01)

(58) Field of Classification Search
CPC ....... G01N 2223/611; G01N 2223/507; G01N 2223/3306; G01N 2223/40; H01J 2235/08; H01J 2235/081; H01J 2235/086
See application file for complete search history.

(56) References Cited

U.S. PATENT DOCUMENTS

| | | | |
|---|---|---|---|
| 6,008,610 | A | 12/1999 | Yuan et al. |
| 6,031,611 | A | 2/2000 | Rosakis et al. |
| 6,437,463 | B1 | 8/2002 | Hazelton |
| 6,486,955 | B1 | 11/2002 | Nishi |
| 6,504,162 | B1 | 1/2003 | Binnard |
| 6,509,957 | B1 | 1/2003 | Tanaka |
| 6,813,000 | B1 | 11/2004 | Nishi |
| 6,897,963 | B1 | 5/2005 | Taniguchi |
| 7,245,696 | B2 | 7/2007 | Yun et al. |
| 7,990,543 | B1 | 8/2011 | Mello |
| 9,448,190 | B2 | 9/2016 | Yun |
| 9,594,036 | B2 | 3/2017 | Yun |
| 9,646,732 | B2 | 5/2017 | Adler |
| 9,777,793 | B1 | 10/2017 | Chen |
| 9,823,203 | B2 | 11/2017 | Yun |
| 9,857,701 | B2 | 1/2018 | Schibazaki |
| 9,984,852 | B1 | 5/2018 | Otger et al. |
| 10,033,840 | B2 | 7/2018 | Vange |
| 10,468,230 | B2 | 11/2019 | Lavely et al. |
| 10,535,495 | B2 | 1/2020 | Willis et al. |
| 2001/0041297 | A1 | 11/2001 | Nishi |
| 2002/0196421 | A1 | 12/2002 | Tanaka |
| 2003/0029012 | A1 | 2/2003 | Amatucci |
| 2003/0106378 | A1 | 6/2003 | Giannakopoulos |
| 2003/0194053 | A1 | 10/2003 | Schramm |
| 2004/0080818 | A1 | 4/2004 | Olschewski |
| 2004/0128918 | A1 | 7/2004 | Yang |
| 2004/0135980 | A1 | 7/2004 | Hill |
| 2004/0244208 | A1 | 12/2004 | Sawada |
| 2005/0168076 | A1 | 8/2005 | Hazelton |
| 2006/0178009 | A1 | 8/2006 | Tanaka |
| 2007/0267995 | A1 | 11/2007 | Binnard |
| 2008/0094593 | A1 | 4/2008 | Shibazaki |
| 2008/0239257 | A1 | 10/2008 | Hagiwara |
| 2009/0284723 | A1 | 11/2009 | Shibazaki |
| 2010/0045659 | A1 | 2/2010 | Yagi |
| 2010/0222898 | A1 | 9/2010 | Yang |
| 2010/0296070 | A1 | 11/2010 | Shibazaki |
| 2011/0096312 | A1 | 4/2011 | Yoshimoto |
| 2011/0102761 | A1 | 5/2011 | Yoshimoto |
| 2011/0123913 | A1 | 5/2011 | Yoshimoto |
| 2011/0141448 | A1 | 6/2011 | Aoki |
| 2012/0326032 | A1 | 12/2012 | Benner |
| 2015/0213995 | A1 | 7/2015 | Muray |
| 2015/0276952 | A1 | 10/2015 | Morita |
| 2015/0303021 | A1 | 10/2015 | Parker |
| 2016/0005636 | A1 | 1/2016 | Ichinose |
| 2016/0027609 | A1 | 1/2016 | Sharma |
| 2017/0178980 | A1 | 6/2017 | Owen |
| 2017/0200524 | A1 | 7/2017 | Adler |
| 2017/0269011 | A1 | 9/2017 | Statham |
| 2018/0151326 | A1 | 5/2018 | Kieft |
| 2018/0358199 | A1 | 12/2018 | Kumamoto |
| 2019/0017948 | A1 | 1/2019 | Anan |

OTHER PUBLICATIONS

John P Hogan, Robert A Gonsalves, and Allen S Krieger. Fluorescent computer tomography: a model for correction of x-ray absorption_ IEEE Transactions on Nuclear Science, 38(6):1721-1727, 1991.

M Holler, A Diaz, M Guizar-Sicairos, P Karvinen, Elina Farm, Emma Harkonen, Mikko Ritala, A Menzel, J Raabe, and P Bunk. X-ray ptychographic computed tomography at 16 nm isotropic 3d resolution. Scientific Reports 4, 2014.

Martin Dierolf, Andreas Menzel, Pierre Thibault, Philipp Schneider, Cameron M Kewish, Roger Wept, Oliver Bunk, and Franz Pfeiffer. Ptychographic x-ray computed tomography at the nanoscale. Nature, 467(7314):436-439, 2010.

Rina Foygel Barber, Emil Y Sidky, Taly Gilat Schmidt, and Xiaochuan Pan. An algorithm for constrained one-step inversion of spectral ct data. arXiv preprint arXiv: 1511.03384, 2015.

Martin D de Jonge and Stefan Vogt Hard x-ray fluorescence tomography—an emerging tool for structural visualization Current opinion in structural biology, 20(5):606-614, 2010.

Ruoqiao Zhang, Jean-Baptiste Thibault, Charles A Bouman, Ken D Sauer, and Jiang Hsieh. A model-based iterative algorithm for dual-energy x-ray CT reconstruction. In Proc. Int Cont Image Form in X-ray CT, pp. 439-443, 2012.

Carsten O Schirra, Ewald Roessl, Thomas Koehler, Bernhard Brendel, Axel Thran, David Z Pan, Mark A Anastasio, iind Roland Proksa. Statistical reconstruction of material decomposed data in spectral CT. Medical Imaging, IEEE Wransactions on, 32 (7):1249-1257, 2013.

Xu, Jiaofeng, "Modeling and Development of Iterative Reconstruction Algorithms in Emerging X-ray Imaging Technologies", All Theses and Dissertations (ETDs). 1270, available at https://openscholarship.wustl.edu/etd/1270 2014).

JK Lim, P Frigola, G Travish, JB Rosenzweig, SG Anderson, WJ Brown, JS Jacob, CL Robbins, and AM Tremaine. An adjustable, short focal length permanent-magnet quadrupole based electron beam final focus system. Physical Review Special Topics—Accelerators and Beams, 8(7):072401, 2005.

Mohammadi-Gheidari et al., "Electron optics of multi-beam scanning electron microscope", Nuclear Instruments and Methods in Physics Research A 645, 60-67 (2011).

A.L. Eberle, S. Mikula, R. Schalek, J. W. Lichtman, M. L. Knothetate, and D. Zeidler. High-resolution, high-throughput imaging with a multi-beam scanning electron microscope. J. Microscopy, 259:114-120, 2015.

Anna Lena Keller, Dirk Zeidler, Thomas Kernen, "High throughput data acquisition with a multi-beam SEM," Proc. SPIE 9236, Scanning Microscopies 2014, 92360B (Sep. 16, 2014).

P.C. Post, A. Mohammadi-Gheidari, C. W. Hagen, and P. Kruit. Parallel electron-beam-induced deposition using a multi-beam scanning electron microscope. Journal of Vacuum Science & Technology B, 29(6):06F310, 2011.

Yanxia Zhang and Pieter Kruit. Design of a high brightness multi-electron-beam source. Physics Procedia, 1 (1 ):553-563, 2008.

Ming Lu. Nanofabrication of Fresnel zone plates for soft X-ray imaging at carbon edge. Stony Brook University Dissertation, 2006.

Ji-Ho Chang, John MM Anderson, and John R Votaw. Regularized image reconstruction algorithms for positron emission tomography. IEEE transactions on medical imaging, 23(9):1165-1175, 2004.

Quantitative x ray analysis system. User's Manual and Guide to X Ray Fluorescence Technique. International Atomic Energy Agency, Feb. 2009, http://www-pub.iaea.org/MTCD/publications/PDF/IAEA-CMS-1_CD_web/PDF/CMS_21.pdf/. [Online; accessed Oct. 22, 2017].

VD Saveliev, L Feng, CR Tull, S Barkan, M Takahashi, and E Damron. Single- and four-element large area silicon drift detector x-ray spectrometers for xrf applications. Sli Nano Technology USA Inc., http://www.dxcicdd.com/10/PDF/High1/o20Performance%20Spectrometers_DXC2010.pdf/. [Online; accessed Oct. 22, 2017].

A Feldkamp, LC Davis, and JW Kress. Practical cone-beam algorithm. J_ Opt. Soc. Am, 1 (6):612-619, 1984.

Fessler, "Statistical Image Reconstruction Methods for Transmission Tomography", downloaded from http://web.eecs.umich.edu/-fessler/book/fessler-00-sir,updated.pdf, Apr. 20, 2016.

Konstantins Jefimovs, Joan Vila-Comamala, Tero Pilvi, Jorg Raabe, Mikko Ritala, and Christian David. Zone-doubling technique to produce ultrahigh-resolution x-ray optics. Physical review letters, 99(26):264801, 2007.

(56) References Cited

OTHER PUBLICATIONS

Kazuto Yamauchi, Kazuya Yamamura, Hidekazu Mimura, Yasuhisa Sano, Akira Saito, Alexei Souvorov, Makina Yabashi, Kenji Tamasaku, Tetsuya Ishikawa, and Yuzo Mori. Nearly diffraction-limited line focusing of a hard-x-ray beam with an elliptically figured mirror. Journal of synchrotron radiation, 9(5):313-316, 2002.

Emanuel Levitan and Gabor T Herman. A maximum a posteriori probability expectation maximization algorithm for mage reconstruction in emission tomography. IEEE Transactions on Medical Imaging, 6(3):185-192, 1987.

Bjorn Cederstrom, Mats Lundqvist, and Carolina Ribbing. Multiprism x-ray lens. Applied physics letters, 81(8):1399-1401, 2002.

Yu I Dudchik, NN Kolchevsky, FF Komarov, Y Kohmura, M Awaji, Y Suzuki, and T Ishikava. Glass capillary x-ray lens: fabrication technique and ray tracing calculations. Nuclear Instruments and Methods in Physics Research Section A: Accelerators, Spectrometers, Detectors and Associated Equipment, 454(2):512-519, 2000.

Joan Vila-Comamala, Sergey Gorelick, Elina Farm, Cameron M Kewish, Ana Diaz, Ray Barrett, Vitaliy A Guzenko, Mikko Ritala, and Christian David. Ultra-high resolution zone-doubled diffractive x-ray optics for the multi-kev regime. : Optics express, 19(1):175---184, 2011.

Jeffrey A Fessler. Mean and variance of implicitly defined biased estimators {such as penalized maximum likelihood): Applications to tomography. IEEE Transactions on Image Processing, 5(3):493-506, 1996.

Patrick J La Riviere, David Billmire, Phillip Vargas, Mark Rivers, and Stephen R Sutton. Penalized-likelihood image reconstruction for x-ray fluorescence computed tomography. Optical Engineering, 45(7):077005, 2006.

Lin Fu, Tzu-Cheng Lee, Soo Mee Kim, Adam M Alessio, Paul E Kinahan, Zhiqian Chang, Ken Sauer, Mannudeep K Kalra, and Bruno De Man. Comparison between pre-log and post-log statistical models in ultra-low-dose ct reconstruction. IEEE transactions on medical imaging, 36(3):707-720, 2017.

Zhiqian Chang, Ruoqiao Zhang, Jean-Baptiste Thibault, Debashish Pal, Lin Fu, Ken Sauer, and Charles Bouman. Modeling and pre-treatment of photon-starved ct data for iterative reconstruction. IEEE transactions on medical imaging, 36(1):277-287, 2017.

Stuart Geman and Donald Geman. Stochastic relaxation, gibbs distributions, and the bayesian restoration of images. IEEE Transactions on pattern analysis and machine intelligence, (6):721-741, 1984.

David A Chesler, Stephen J Riederer, and Norbert J Pelc. Noise due to photon counting statistics in computed x-ray tomography. Journal of computer assisted tomography, 1(1):64-74, 1977.

Lawrence A Shepp and Benjamin F Logan. The fourier reconstruction of a head section. IEEE Transactions on Nuclear Science, 21(3):21-43, 1974.

Fein, Geogg, "IARPA seeks enhanced method for integrated circuit validation", Jane's International Defence Review (ihs.com), Jan. 18, 2017.

Rowe, Martin, "Fake ICs: Another weapon in their detection", EON Network, retreived from https:lwww.edn.com/:design/test and measuremenl/4458370/Fake-ICs--Another-weapon-in-their-detection (May 22, 2017).

Shimadzu, "Electron Probe Microanalyzer EPMA-8050G", retreived from https://mahzadkala.com/wp-contenl/uploads/2015/09/EPMA-8050G.pdf on Jul. 16, 2018.

Zeiss, "ZEISS X-ray Tomography Solutions", retrieved from https:lwww.zeiss.com/microscopy/int/products/x-ray-microscopy.html on Jul. 16, 2018.

Yanxia Zhang. A 100-electron-beam source from a high brightness Schottky emitter for fast patterning applications. TU Delft, Delft University of Technology, pp. 1-70, 2008.

Yanxia Zhang. A 100-electron-beam source from a high brightness Schottky emitter for fast patterning applications. TU Delft, Delft University of Technology, pp. 71-147, 2008.

Matt Malloy, Brad Thiel, Benjamin D. Bunday, Stefan Wurm, Maseeh Mukhtar, Kathy Quoi, Thomas Kernen, Dirk Zeidler, Anna Lena Eberle, Tomasz Garbowski, Gregor Dellemann, Jan Hendrik Peters, "Massively parallel E-beam Inspection: enabling next-generation patterned defect inspection for wafer and mask manufacturing," Proc. SPIE 9423, Alternative Lithographic Technologies VII, 942319 (Mar. 19, 2015).

Shammi Rahangdale, Yan Ren, CW Hagen, and P Kruit. Multi-beam scanning electron microscopy (mbsem) at 0.5 lb/s. 14th International Congress for Stereology and Image Analysis, 2015.

Sin Cheng Siah, R Jaramillo, Rupak Chakraborty, Peter T Erslev, Cheng-Jun Sun, Tsu-Chien Weng, Michael F Toney, Glenn Teeter, and Tonio Buonassisi. X-ray absorption spectroscopy study of structure and stability of disordered (Cu2SnS3)1-x(ZnS)x alloys. Photovoltaics, IEEE Journal of, 5(1):372-377, 2015.

Oifeng Zhang, Evan Uchaker, Stephanie L Candelaria, and Guozhong Cao. Nanomaterials for energy conversion and storage. Chemical Society Reviews, 42(7):3127-3171, 2013.

Leslie J Allen, Adrian J D'Alfonso, Bert Freitag, and Dmitri O Klenov. Chemical mapping at atomic resolution using energy-dispersive x-ray spectroscopy. MRS bulletin, 37(01 ):47-52, 2012.

P Schlossmacher, DO Klenov, B Freitag, and HS Von Harrach. Enhanced detection sensitivity with a new windowless Keds system for aem based on silicon drift detector technology. Microscopy today, 18(04):14-20, 2010.

David B Williams, Adam J Papworth, and Masashi Watanabe. High resolution x-ray mapping in the stem. Journal of Electron Microscopy, 51(supplement):S113-S126, 2002.

Nestor J Zaluzec. Analytical formulae for calculation of x-ray detector solid angles in the scanning and scanning/transmission analytical electron microscope. Microscopy and Microanalysis, 20(04):1318-1326, 2014.

M Haider, S Uhlemann, and J Zach. Upper limits for the residual aberrations of a high-resolution aberration-corrected stem. Ultramicroscopy, 81(3):163-175, 2000.

Kayla X. Nguyen, Meagan E. Holtz, Justin Richmond-Decker and David A. Muller. Spatial resolution in scanning electron microscopy without a specimen vacuum chamber. Microscopy and Microanalysis, 22. 754-767, 2016.

Kueju Wang, Zhipeng Pan, Feifei Fan, Jiangwei Wang, Yang Liu, Scott X Mao, Ting Zhu, and Shuman Xia. Nanoscale deformation analysis with high-resolution transmission electron microscopy and digital image correlation. Journal of Applied Mechanics, 82(12):121001, 2015.

Ilya D Feranchuk, A Ulyanenkov, J Harada, and JCH Spence. Parametric x-ray radiation and coherent bremsstrahlung from nonrelativistic electrons in crystals. Physical Review E, 62(3):4225, 2000.

OL Krivanek, N Dellby, and MF Murfitt. Aberration-corrected scanning transmission electron microscopy of semiconductors. In Journal of Physics: Conference Series, vol. 326, p. 012005. IOP Publishing, 2011.

OL Krivanek, GJ Corbin, N Dellby, BF Elston, RJ Keyse, MF Murfitt, CS Own, ZS Szilagyi, and JW Woodruff. An electron microscope for the aberration-corrected era. Ultramicroscopy, 108(3):179-195, 2008.

Huolin L Xin and David A Muller. Aberration-corrected adf-stem depth sectioning and prospects for reliable 3d imaging in s/tem. Journal of electron microscopy, 58(3): 157-165, 2009.

Michael Bajura, Greg Boverman, John Tan, Gene Wagenbreth, Craig Milo Rogers, Michael Feser, Juana Rudati, Andrei Tkachuk, Stephen Aylward, and Patrick Reynolds. Imaging integrated circuits with x-ray microscopy. In Proc. 36th GO-MACTech Conf, pp. 1-4, 2011.

X-ray nanotomography imaging for circuit integrity, https://www-ssrl.slac.stanford.edu/content/science/highlight/2011-09-26/x-ray-nanotomography-imaging-circuit-integrity, 2011.

Eldad Haber and Michal Holtzman Gazit. Model fusion and joint inversion. Surveys in Geophysics, 34(5):675-695, 2013.

Bicer T., Gursoy D., Kettimuthu R, De Carlo F., Agrawal G., Foster I.T. (2015) Rapid Tomographic Image Reconstruction via Large-Scale Parallelization. In: Traff J., Hunold S., Versaci F. (eds) Euro-Par 2015: Parallel Processing. Euro-Par 2015. Lecture Notes in Computer Science, vol. 9233. Springer, Berlin, Heidelberg (2015).

(56) References Cited

OTHER PUBLICATIONS

Hong et al., "A New Workflow for x-ray fluorescence tomography: MAPSToTomoPy", Pree SPIE Int Soc Opt Eng. Aug. 9, 2015; 9592 (2015).
Di, Zichao, Leyffer, Sven and Wild, Stefan M. Optimization-based approach for joint x-ray fluorescence and transmission tomographic inversion. Siam J. Imaging Sciences, 9(1):1-23, 2016.
Ullom, JN and Doriese, WB and Fischer, DA and Fowler, JW and Hilton, GC and Jaye, C and Reintsema, CD and Swetz, DS and Schmidt, DR Transition-edge sensor microcalorimeters for x-ray beamline science. Synchrotron Radiation News, 27(4): 24-27, 2014.
Mimura, Hidekazu and Handa, Soichiro and Kimura, Takashi and Yumoto, Hi-rokatsu and Yamakawa, Daisuke and Yokoyama, Hikaru and Matsuyama, Satoshi and Inagaki, Kouji and Yamamura, Kazuya and Sano, Yasuhisa and others. Breaking the 10 nm barrier in hard-x-ray focusing. Nature Physics, 6(2):122-125, 2010.
Edwards, Paul R and Martin, Robert W. Cathodoluminescence nano-characterization of semiconductors. Semiconductor Science and Technology, 26(6):064005, 2011.
Ashwin C Aire, Benjamin JM Brenny, Toon Coenen, Aitzol Garcfa-Etxarri, Albert Polman, and Jennifer A. Dionne. Nanoscale optical tomography with cathodoluminescence spectroscopy. Nature Nanotechnology, vol. 10, pp. 429-436 2015.
Thonke, K and Tischer, I and Hocker, M and Schirra, M and Fujan, K and Wiedenmann, M and Schneider, R and Frey, M and Feneberg, M. Nanoscale characterisation of semiconductors by cathodoluminescence. In IOP Conference Series: Materials Science and Engineering, vol. 55, p. 012018. IOP Publishing, 2014.
R. Chivas and S. Silverman, "Adaptive grinding and polishing of packaged integrated circuits," 2014 IEEE International Reliability Physics Symposium, Waikoloa, HI, pp. FA.4.1-FA.4.6 (2014).
Chivas, Robert D. Adaptive grinding and polishing of silicon integrated circuits to ultrathin remaining thickness. In 41 st nternational Symposium for Testing and Failure Analysis. Asm, 2015.
Manske, Eberhard and Jager, Gerd and Hausotte, Tino and FuBl, Roland. Recent developments and challenges of rianopositioning and nanomeasuring technology. Measurement Science and Technology, 23(7):074001, 2012.
Saeed Olyaee and Samaneh Hamedi (Apr. 1, 2010). Nano-Metrology Based on the Laser Interferometers, Advances in Measurement Systems Milind Sharma, IntechOpen, DOI: 10.5772/8740. Available from: https://www.intechopen. t;com/books/advances-in-measurement-systems/nano-metrology-based-on-the-laser-interferometers (2010).
Xu, Feng and Helfen, Lukas and Suhonen, Heikki and Elgrabli, Dan and Bayat, Sam and Reischig, Peter and S, aumbach, Tilo and Cloetens, Peter. Correlative nanoscale 3D imaging of structure and composition in extended objects. PLoS ONE, 7(11), 2012.
Brownlow, Les and Mayo, Sheridan and Miller, Peter and Sheffield-Parker, Julie. Towards 50-nanometre resolution with an sem-hosted x-ray microscope. Microscopy and Analysis, 112:13, 2006.
Schropp, A and Boye, P and Goldschmidt, A and Honig, S and Hoppe, Rand Patommel, J and Rakete, C and Samberg, D and Stephan, S and Schader, S and Burghammer, M and Schroer, CG. Non-destructive and quantitative imaging of a nano-structured microchip by ptychographic hard x-ray scanning microscopy_ Journal of microscopy, 241 (1):9-12, 2011.
Bleuet, Pierre and Cloetens, Peter and Gergaud, Patrice and Marielle, Denis and Chevalier, Nicolas and Tucoulou, Remi and Susini, Jean and Chabli, Amal. A hard x-ray nanoprobe for scanning and projection nanotomography. Review of scientific instruments, 80(5):056101, 2009.
Withers, Philip J. X-ray nanotomography. Materials today, 10(12):26-34, 2007.
S. C. Mayo, P.R. Miller, S. W. Wilkins, T. J. Davis, D. Gao, T. E. Gureyev, David Paganin, D. J. Parry, A. Pogany, and A.W. Stevenson. Quantitative x-ray projection microscopy: phase-contrast and multi-spectral imaging. Journal of microscopy, 207(2): 79-96, 2002.
SC Mayo, PR Miller, J Sheffield-Parker, Tim Gureyev, and SW Wilkins. Attainment of< 60 nm resolution in phase-contrast x-ray microscopy using an add-on to an sem. In 8th International Conference on X-ray Microscopy, IPAP Conference Series, pp. 343-345, 2005.
S Mayo, T Davis, Timur Gureyev, P Miller, David Paganin, A Pogany, A Stevenson, and S Wilkins. X-ray phase-contrast microscopy and microtomography. Optics Express, 11 (19):2289-2302, 2003.
John Amanatides, Andrew Woo, et al. A fast voxel traversal algorithm for ray tracing. In Eurographics, vol. 87, pp. 3---10, 1987.
Burnett, TL and McDonald, SA and Gholinia, A and Geurts, R and Janus, M and Slater, T and Haigh, SJ and Omek, C and Almuaili, F and Engelberg, DL and Thompson, GE and Withers, PJ. Correlative tomography. Scientific reports, 4, 2014.
Bradley K Alpert, W Bertrand Doriese, Joseph W Fowler, and Joel N Ullom. Predicted energy resolution of a running-sum algorithm for microcalorimeters. Journal of Low Temperature Physics, 167(5-6):582-587, 2012.
Filip Jacobs, Erik Sundermann, Bjorn De Sutter, Mark Christiaens, and Ignace Lemahieu. A fast algorithm to calculate the exact radiological path through a pixel or voxel space. Journal of computing and information technology, 6(1 ):89-94. 1998.
Robert L Siddon. Fast calculation of the exact radiological path for a three-dimensional ct array. Medical physics, 12(2):252-255, 1985.
UW Fowler, BK Alpert, WB Doriese, DA Fischer, Chemo Jaye, Young-Il Joe, GC O'Neil, OS Swetz, and JN Ullom. Microcalorimeter spectroscopy at high pulse rates: A multi-pulse fitting technique. The Astrophysical Journal Supplement Series, 219(2):35, 2015.
Johan Nuyts, Bruno De Man, Jeffrey A Fessler, Wojciech Zbijewski, and Freek J Beekman. Modelling the physics in the iterative reconstruction for transmission computed tomography. Physics in medicine and biology, 58(12):R63, 2013.
M Feser, C Jacobsen, P Rehak, and G DeGeronimo. Scanning transmission x-ray microscopy with a segmented detector. In Journal de Physique IV (Proceedings), vol. 104, pp. 529-534. EDP sciences, 2003.
Hakan Erdogan and Jeffrey A Fessler. Monotonic algorithms for transmission tomography. IEEE transactions on medical imaging, 18(9):801-814, 1999.
Bruno Golosio, Alexandre Simionovici, Andrea Somogyi, Laurence Lemelle, Marina Chukalina, and Antonio Brunetti_ internal elemental microanalysis combining x-ray fluorescence, compton and transmission tomography. Journal of applied Physics, 94(1): 145-156, 2003.
U Maser, B Lai, W Yun, SD Shastri, Z Cai, W Rodrigues, S Xua, and E Trackhtenberg. Near-field stacking of zone plates in the x-ray range. In Proc. of SPIE, vol. 4783, pp. 74-81, 2002.
Alvaro R De Pierro. A modified expectation maximization algorithm for penalized likelihood estimation in emission omography. IEEE transactions on medical imaging, 14(1 ):132-137, 1995.
Nghia T. Vo, Michael Drakopoulos, Robert C. Atwood, and Christina Reinhard, Reliable Method for Calculating the Center of Rotation in Parallel-beam Tomography, Optics Express, 22(16):19078-19086, 2014.
Tilman Donath, Felix Beckmann, and Andreas Schreyer. Automated determination of the center of rotation in omography data. J. Opt. Soc. Am., 23(5):1048-1057, 2006.
C Noyan, SK Kaldor, P-C Wang, and J_ Jordan-Sweet. A cost-effective method for minimizing the sphere-of-confusion error of x-ray microdiffractometers. Review of scientific instruments, 70(2): 1300-1304, 1999.
Weihe Xu, Kenneth Lauer, Yong Chu, and Evgeny Nazaretski. A high-precision instrument for mapping of rotational errors in rotary stages. Journal of synchrotron radiation, 21(6):1367-1369, 2014.
Marcel Beister, Daniel Kolditz, and Willi A. Kalender. Iterative reconstruction methods in x-ray ct. Physica medica, 28 (2):94-108, 2012.
David S Rigie and Patrick J. La Riviere. Joint reconstruction of multi-channel, spectral ct data via constrained total nuclear variation minimization. Physics in medicine and biology, 60(5): 1741, 2015.
Paulo RS Mendonca, Peter Lamb, and Dushyant V. Sahani. A flexible method for multi-material decomposition of dual energy ct images. IEEE transactions on medical imaging, 33(1):99-116, 2014.

(56) References Cited

OTHER PUBLICATIONS

Kenneth Lange, Richard Carson, et al. Em reconstruction algorithms for emission and transmission tomography. J Comput Assist Tomogr, 8(2):306-16, 1984.

SH Mangles, GM Gagne, A Krol, FD Thomas, and R. Narayanaswamy_ Transmission maximum-likelihood reconstruction with ordered subsets for cone beam ct. Physics in Medicine and Biology, 40(7):1225, 1995.

Chris Kamphuis and Freek J. Beekman. Accelerated iterative transmission ct reconstruction using an ordered subsets convex algorithm. IEEE Transactions on Medical Imaging, 17(6):1101-1105, 1998.

Hongqing Zhu, Huazhong Shu, Jian Zhou, and Limin Luo. A weighted least squares pet image reconstruction method using iterative coordinate descent algorithms. In Nuclear Science Symposium Conference Record, 2004 IEEE, vol. 6, pp. 3380-3384. IEEE, 2004.

Soo-Jin Lee. Accelerated coordinate descent methods for bayesian reconstruction using ordered subsets of projection data. In International Symposium on Optical Science and Technology, pp. 170-181. International Society for Optics and Photonics, 2000.

Peter J. Green. Bayesian reconstructions from emission tomography data using a modified em algorithm. IEEE ransactions on medical imaging, 9(1):84-93, 1990.

Peter J. Green. On use of the em for penalized likelihood estimation. Journal of the Royal Statistical Society. Series B Methodological), p. 443-452, 1990.

Jean-Baptiste Thibault, Ken D. Sauer, Charles A. Bouman, and Jiang Hsieh. A three-dimensional statistical approach to improved image quality for multi-slice helical ct. Medical physics, 34(11):4526-4544, 2007.

Charles A. Bouman and Ken Sauer. A unified approach to statistical tomography using coordinate descent optimization. IEEE Transactions on image processing, 5(3): 480-492, 1996.

Ken Sauer and Charles Bouman. A local update strategy for iterative reconstruction from projections. IEEE Transactions on Signal Processing, 41 (2):534-548, 1993.

Freek J. Beekman and Chris Kamphuis. Ordered subset reconstruction for x-ray ct. Physics in medicine and biology, 46(7): 1835, 2001.

Yong Long and Jeffrey A. Fessler. Multi-material decomposition using statistical image reconstruction in x-ray ct. Proc. 2nd Intl. Mtg. on image formation in X-ray CT, pp. 413-416, 2012.

Sangtae Ahn, Jeffrey A. Fessler, Doron Blatt, and Alfred 0. Hero. Convergent in-cremental optimization transfer I: algorithms: Application to tomography_ IEEE Transactions on Medical Imaging, 25(3):283-296, 2006.

Zhou Yu, Jean-Baptiste Thibault, Charles A. Bouman, Ken D. Sauer, and Jiang Hsieh. Fast model-based x-ray ct reconstruction using spatially nonhomogeneous icd optimization. IEEE Transactions on image processing, 20(1):161-175, 2011.

Donghwan Kim, Debashish Pal, Jean-Baptiste Thibault, and Jeffrey A. Fessler. Accelerating ordered subsets image econstruction for x-ray ct using spatially nonuniform optimization transfer. IEEE transactions on medical imaging, 32 (11):1965-1978, 2013.

H. Malcolm Hudson and Richard S. Larkin. Accelerated image reconstruction using ordered subsets of projection data. IEEE transactions on medical imaging, 13(4):601-609, 1994.

Yong Long and Jeffrey A. Fessler. Multi-material decomposition using statistical image reconstruction for spectral ct. IEEE transactions on medical imaging, 33(8): 1614-1626, 2014.

Sascha Moehrs, Michel Defrise, Nicola Belcari, Alberto Del Guerra, Antonietta Bartoli, Serena Fabbri, and Gianluigi Zanetti. Multi-ray-based system matrix generation for 3d pet reconstruction. Physics in medicine and biology, 53(23):6925, 2008.

H. Heinrich, P. Ziegenhein, CP Kamerling, H. Froening, and U. Oelfke. Gpu-accelerated ray-tracing for real-time treatment planning_ In Journal of Physics: Conference Series, vol. 489, p. 012050. IOP Publishing, 2014.

Peille et al., "Performance assessment of different pulse reconstruction algorithms for the ATHENA X-ray Integral Field Unit," Proc. SPIE 9905, Space Telescopes and Instrumentation 2016: Ultraviolet to Gamma Ray, 99055W (Jul. 11, 2016).

Fang Xu. Fast implementation of iterative reconstruction with exact ray-driven projector on gpus. Tsinghua Science & Technology, 15(1):30-35, 2010.

WJ Palenstijn, KJ Batenburg, and J. Sijbers. Performance improvements for iterative electron tomography reconstruction using graphics processing units (gpus). Journal of structural biology, 176(2):250-253, 2011.

Richard Gordon, Robert Bender, and Gabor T. Herman. Algebraic reconstruction techniques (art) for three-dimensiona electron microscopy and x-ray photography. Journal of theoretical Biology, 29(3):4711N1477-4761N2481, 1970.

Anders H. Andersen and Avinash C. Kak. Simultaneous algebraic reconstruction technique (sari): a superior implementation of the art algorithm. Ultrasonic imaging, 6(1):81-94, 1984.

Fang Xu, Wei Xu, Mel Jones, Bettina Keszthelyi, John Sedat, David Agard, and Klaus Mueller. On the efficiency of terative ordered subset reconstruction algorithms for acceleration on gpus. Computer methods and programs in biomedicine, 98(3):261-270, 2010.

Flora et al., "Curvature-Based Techniques for Real-Time Stress Measurement During Thin-Film Growth", Chapter 7 (p. 191) in "In Situ Real-Time Characterization of Thin Films", edited by Orlando Auciello and Alan R. Krauss, ISBN D-471-24141-5, John Wiley & Sons, Inc. (2001).

Michal A. Brown, Tae-Soon Park, Ares Rosakis, Ersan Ustundag, Young Huang, Nobumichi Tamura, and Bryan Valek A comparison of x-ray microdiffraction and coherent gradient sensing in measuring discontinuous curvatures in thin film: substrate systems. Journal of applied mechanics, 73(5):723-729, 2006.

T. S Park, S. Suresh, AJ Rosakis, and J. Ryu. Measurement of full-field curvature and geometrical instability of thin film-substrate systems through cgs interferometry. Journal of the Mechanics and Physics of Solids, 51 (11 ):2191-2211, 2003.

Hansuk Lee, Ares J. Rosakis, and LB Freund. Full-field optical measurement of curvatures in ultra-thin-film-substrate systems in the range of geometrically nonlinear deformations. Journal of Applied Physics, 89(11):6116-6129, 2001.

AJ Rosakis, RP Singh, Y. Tsuji, E. Kolawa, and NR Moore. Full field measurements of curvature using coherent gradient sensing: application to thin film characterization. Thin Solid Films, 325(1):42-54, 1998.

Xue Feng, Yonggang Huang, Hanqing Jiang, Due Ngo, and Ares J. Rosakis. The effect of thin film/substrate radii on the stoney formula for thin film/substrate subjected to nonuniform axisymmetric misfit strain and temperature. Journal of Mechanics of Materials and Structures, 1 (6): 1041-1053, 2006.

Yasumasa Okada and Yozo Tokumaru. Precise determination of lattice parameter and thermal expansion coefficient of silicon between 300 and 1500 k. Journal of applied physics, 56(2):314-320,1984.

Simos, Nick & Chu, Yong & Broadbent, A & Nazaretski, E & Margulies, Lawrence & Dyling, 0 & Shen, Q & Fallier, Martin. Achieving Vibration Stability of the NSLS-11 Hard X-ray Nanoprobe Beamline. AIP Conference Proceedings, 1365 (2011).

Yong S. Chu. Preliminary Design Report for the Hard X-ray (HXN) Nanoprobe Beamline. NSLS-11 Project, Brookhaven National Laboratory, 2010.

Yong Chu, Hanfei Yan, Evgeny Nazaretski, Sebastian Kalbfleisch, Xiaojing Huang, Kenneth Lauer, and Nathalie Bouet Hard X-ray nanoprobe facility at the National Synchroton Light Source II. SPIE Newsroom, DOI: 10.1117/2.1201508.006068, 2015.

En-Te Hwu, Evgeny Nazaretski, Yong S. Chu, Huang-Han Chen, Yu-Sheng Chen, Weihe Xu, and Yeukuang Hwu. Design and characterization of a compact nano-positioning system for a portable transmission X-ray microscope. Review of Scientific Instruments, 84(12):123702, 2013.

Jungdae Kim, K Lauer, H. Yan, YS Chu, and E. Nazaretski. Compact prototype apparatus for reducing the circle of t: confusion down to 40 nm for x-ray nanotomography. Review of Scientific Instruments, 84(3):035006, 2013.

(56) References Cited

OTHER PUBLICATIONS

E. Nazaretski, Jungdae Kim, H. Yan, K. Lauer, D. Eom, D. Shu, J. Maser, Z. Pesic, U. Wagner, C. Rau, et al. Performance and characterization of the prototype nm-scale spatial resolution scanning multilayer Laue lenses microscope. Review of Scientific Instruments, 84(3):033701, 2013.

E. Nazaretski, X. Huang, H. Yan, K. Lauer, R. Conley, N. Bouet, J. Zhou, W. Xu, D. Eom, D. Legnini, et al. Design and performance of a scanning ptychography microscope. Review of Scientific Instruments, 85(3):033707, 2014.

E. Nazaretski, K. Lauer, H. Yan, N. Bouet, J. Zhou, R. Conley, X. Huang, W. Xu, M. Lu, K. Gofron, et al. Pushing the limits: an instrument for hard X-ray imaging below 20 nm. Journal of synchrotron radiation, 22(2):336-341, 2015.

E. Nazaretski, H. Yan, K. Lauer, X. Huang, W. Xu, S. Kalbfleisch, Hui Yan, Li Li, N Bouet, J. Zhou, et al. Nm-scale spatial resolution X-ray imaging with MLL nanofocusing optics: Instrumentational requirements and challenges. In AIP Conference Proceedings, vol. 1764, p. 040001. AIP Publishing, 2016.

Deming Shu, Evgeny Nazaretski, Jungdae Kim, Hanfei Yan, Kenneth Lauer, Brian Mullany, Dennis Kuhne, Jorg Maser, and Yong S. Chu. Optomechanical design of a multilayer Laue lens test bed for 10-nm focusing of hard X-rays. in Journal of Physics: Conference Series, vol. 463, p. 012029. IOP Publishing, 2013.

Andrea Somogyi, Kadda Medjoubi, Gil Baranton, Vincent Le Roux, Marc Ribbens, Fran?is Polack, Pascal Philippot, and J-P Samama. Optical design and multi-length-scale scanning spectra-microscopy possibilities at the Nanoscopium beamline of synchrotron soleil. Journal of synchrotron radiation, 22(4):1118-1129, 2015.

Y. Takeichi, N. Inami, H. Suga, T. Ueno, S. Kishimoto, Y. Takahashi, and K. Ono. Development of a compact scanning transmission X-ray microscope. In Journal of Physics: Conference Series, vol. 502, p. 012009. IOP Publishing, 2014.

Armin Hornung, Kai M. Wurm, Maren Bennewitz, Cyrill Stachniss, and Wolfram Burgard. Octomap: An efficient probabilistic 3d mapping framework based on octrees. Autonomous Robots, 34(3):189-206, 2013.

Tony F. Chan, Hongwei Li, Marius Lysaker, and Xue-Cheng Tai. Level Set Method for Positron Emission Tomography. International journal of biomedical imaging, Hindawi Publishing Corporation, vol. 2007, Article ID 26950, 2007.

Hakan Erdogan and Jeffrey A. Fessler. Ordered subsets algorithms for transmission tomography. Physics in medicine and biology, 44(11):2835, 1999.

Jeffrey A. Fessler, Edward P. Ficaro, Neal H. Clinthorne, and Kenneth Lange. Grouped-Coordinate Ascent Algorithms for Penalized-Likelihood Transmission Image Reconstruction. Medical Imaging, IEEE Transactions on, 16(2):166-175, 1997.

Meng Wu and Jeffrey A. Fessler. Gpu Acceleration of 3d Forward and Backward Projection Using Separable Footprints for X-Ray CT Image Reconstruction. In Proc. Intl. Mtg. Fully 3D Image Recon. Rad. Nuc. Med., pp. 56-59, 2011.

Christian G. Schroer. Reconstructing x-ray fluorescence microtomograms. Applied Physics Letters, 79(12):1912-1914, 2001.

Madison G. McGaffin and Jeffrey A. Fessler. Fast Gpu-Driven Model-Based X-Ray CT Image Reconstruction via Alternating Dual Updates. In Proc. Intl. Mtg_ Fully 3D Image Recon. Rad. Nuc. Med., pp. 312-315, 2015.

Madison Gray McGaffin and Jeffrey A. Fessler. Edge-Preserving Image Denoising via Group Coordinate Descent on the GPU. Image Processing, IEEE Transactions on, 24 (4):1273-1281, 2015.

Raymond F. Egerton, Feng Wang, and Peter A. Crozier. Beam-Induced Damage to Thin Specimens in an Intense Electron Probe. Microscopy and Microanalysis, 12(01): 65-71, 2006.

Daniel P. Wilt, Richard C. Meitzler, and John P. DeVale. Metrics for TRUST in Integrated Circuits. Technical report, PTIC Document, GOMACTech 2008 Proceedings, 2008.

Cyril Crassin, Fabrice Neyret, Sylvain Lefebvre, and Elmar Eisemann. Gigavoxels: Ray-guided streaming for efficient iad detailed voxel rendering. In Proceedings of the 2009 symposium on Interactive 3D graphics and games, pp. 15-22. ACM SIGGRAPH Symposium on Interactive 30 Graphics and Games (130), 2009.

Jinyi Qi and Richard M. Leahy. Iterative reconstruction techniques in emission computed tomography. Physics in medicine and biology, 51(15): R541, 2006.

Kiaojing Huang, Raymond Conley, Nathalie Bouet, Juan Zhou, Albert Macrander, Jorg Maser, Hanfei Yan, Evgeny Nazaretski, Kenneth Lauer, Ross Harder, et al. Achieving hard x-ray nanofocusing using a wedged multilayer laue ens. Optics express, 23(10):12496-12507, 2015.

Hanfei Yan, Evgeny Nazaretski, Kenneth Lauer, Xiaojing Huang, Ulrich Wagner, Christoph Rau, Mohammed Yusuf, an Robinson, Sebastian Kalbfleisch, Li Li, et al. Multimodality hard-x-ray imaging of a chromosome with nanoscale ?patial resolution. Scientific Reports, 6:20112, 2016.

Star Cryoelectronics MICA-1600 X-Ray Spectrometer, http://starcryo.com/ microcal-x-ray-spectrometers/. [Online; accessed Mar. 10, 2016].

Workshop of Industrial Research at NSLS-11: A Report from the Organizing Committee. NSLS-1I Project, Brookhaven National Library, 2014.

Ullom, Joel N and Bennett, Douglas A. Review of superconducting transition-edge sensors for x-ray and gamma-ray spectroscopy. Superconductor Science and Technology, 28(8):84003-84038, 2015.

JP Hays-Wehle, DR Schmidt, JN Ullom, and OS Swetz. Thermal conductance engineering for high-speed TES microcalorimeters. Journal of Low Temperature Physics, pp. 492-497, 2015.

Doriese et al., "Developments in Time-Division Multiplexing of X-ray Transition-Edge Sensors", Journal of Low Temperature Physics, vol. 184, Issue 1-2, pp. 389-395 (2016).

MRJ Palosaari, KM Kinnunen, J Julin, M Laitinen, M Napari, T Sajavaara, WB Doriese, J Fowler, C Reintsema, D Swetz, et al. Transition-edge sensors for particle induced x-ray emission measurements. Journal of Low Temperature Physics, 176(3-4):285-290, 2014.

DA Bennett, RD Horansky, DR Schmidt, AS Hoover, R Winkler, BK Alpert, JA Beall, WB Doriese, JW Fowler, CP Fitzgerald, et al. A high resolution gamma-ray spectrometer based on superconducting microcalorimeters. Review of Scientific Instruments, 83 (9):093113, 2012.

DS Swetz, DA Bennett, KD Irwin, DR Schmidt, and JN Ullom. Current distribution and transition width in superconducting transition-edge sensors. Applied Physics Letters, 101(24):242603, 2012.

Jens Uhlig, Wilfred Fullagar, JN Ullom, WB Doriese, JW Fowler, OS Swetz, N Gador, SE Canton, K Kinnunen, IJ Maasilta, et al_ Table-top ultrafast x-ray microcalorimeter spectrometry for molecular structure. Physical review letters, 110(13):138302, 2013.

Daniel F. Yu and Jeffrey A. Fessler. Edge-preserving tomographic reconstruction with nonlocal regularization. Medical maging, IEEE Transactions on, 21(2):159-173, 2002.

Emil Y Sidky, Chien-Min Kao, and Xiaochuan Pan. Accurate image reconstruction from few-views and limited-angle data in divergent-beam ct Journal of X-ray Science and Technology, 14(2):119-139, 2006.

300

US 11,340,179 B2

NANOFABRICATED STRUCTURES FOR SUB-BEAM RESOLUTION AND SPECTRAL ENHANCEMENT IN TOMOGRAPHIC IMAGING

CROSS-REFERENCE TO RELATED APPLICATION

This application claims the benefit of U.S. Provisional Patent Application No. 62/923,756, filed Oct. 21, 2019, which is incorporated by reference herein in its entirety.

STATEMENT OF GOVERNMENT INTEREST

This invention was made with United States Government assistance under Contract No. FA8650-17-C-9114, awarded by the United States Air Force. The United States Government has certain rights in this invention.

FIELD OF DISCLOSURE

The present disclosure relates to X-ray imaging, and more particularly, to a system using nanofabricated structures to provide sub-beam resolution and spectral enhancement in tomographic imaging.

BACKGROUND

There exists a need for non-destructive, 3-dimensional (3D) imaging of objects of interest at ever-increasing resolutions. For example, integrated circuits (ICs) are being fabricated with nanometer dimensional features such as in the range of 14 nanometers (nm), 7 nm, and smaller. High-resolution imaging of these circuit features is important for testing, verification, and research purposes, to name a few. Yet, many existing imaging techniques such as table-top X-ray systems, optical microscopy, and infrared imaging are limited to micron-level resolution and spectrally narrow imaging, which is insufficient for many applications. Existing high-resolution imaging techniques such as scanning electron microscopy (SEM), transmission electron microscopy (TEM) and atomic force microscopy (AFM) suffer from low-throughput and provide only 2D images, although 3D images are possible via sample destruction (e.g., delayering). Various modalities available at synchrotron end-stations can provide tomographic imaging at the nanometer scale, however this is a resource of limited availability and high expense.

Figure 1:
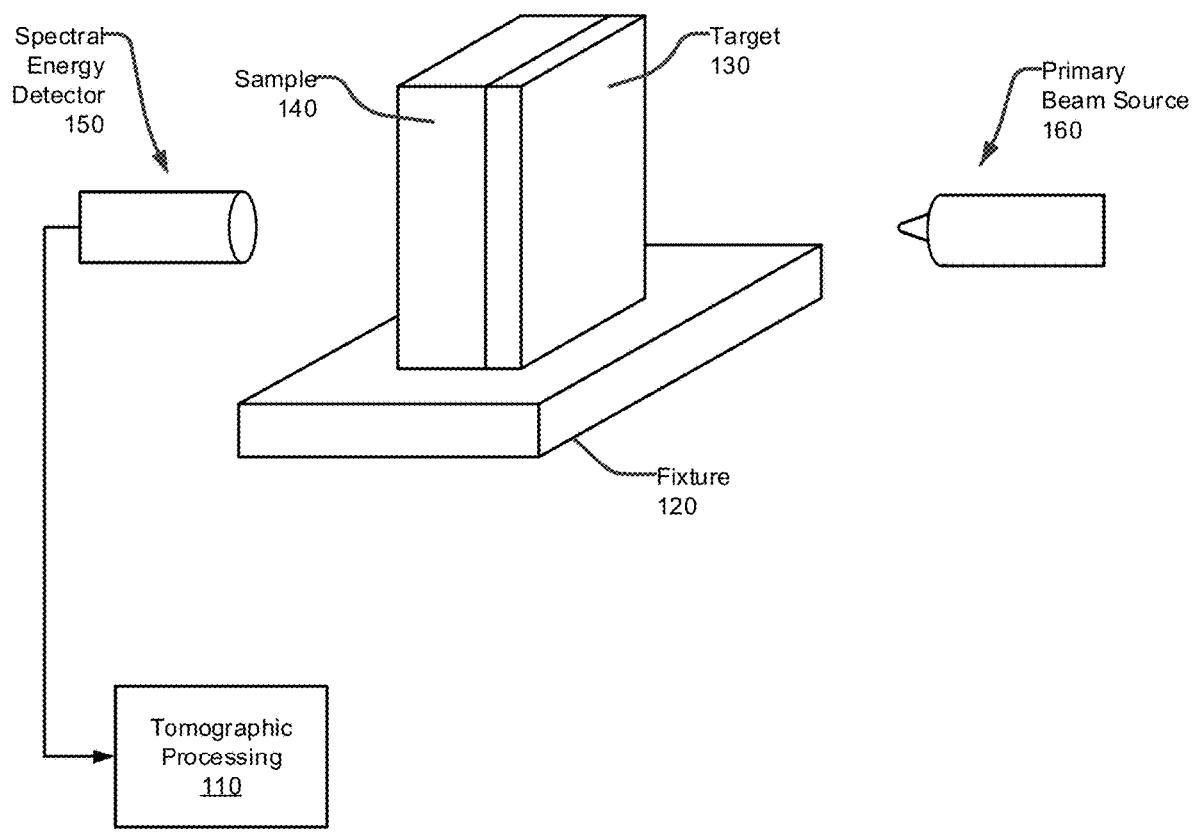
FIG. 1 illustrates an imaging system employing a nanofabricated target structure, configured in accordance with certain embodiments of the present disclosure.

Although the following Detailed Description will proceed with reference being made to illustrative embodiments, many alternatives, modifications, and variations thereof will be apparent to those skilled in the art.

DETAILED DESCRIPTION

Techniques are provided for achieving sub-beam imaging resolution and spectral enhancement of tomographic imaging through the use of multi-material nanofabricated target structures which emit secondary X-rays in response to illumination from a primary particle beam source. The term "sub-beam" resolution refers to the fact that resolution dimensions may be achieved, by the secondary X-rays, which are smaller than the diameter of the primary particle beam, as will be explained in greater detail below.

Overview

As noted previously, there exists a need for non-destructive, 3-dimensional (3D) imaging of objects of interest at ever-increasing resolutions, for example, in the range of 14 nm, 7 nm, and smaller. Imaging of physical features can provide feedback for process improvement, increasing reliability and yield while reducing costs. Manufacturing variability is a particular concern in nanoscale fabrication since high variance in physical features can change performance characteristics, predispose a device to early failure, or produce undesired or unexpected outcomes such as short-circuits and large changes in threshold voltage, for example. At the nanoscale, the variance can approach the mean size of the features. Non-destructive 3D imaging can also be used to inspect microelectromechanical systems (MEMS), welding joints, additively-manufactured parts, grain structure and defects in materials, in-situ material growth under variable conditions, and structural evolution of in-operando nano-scaled devices.

X-rays have high energies and indices of refraction nearly equal to 1, making them suitable for high resolution (sub-micrometer) projection and tomographic imaging. Unfortunately, photons at these energies are particularly difficult to focus and require a relatively large space for focusing optics. Synchrotron beamline end-stations can provide this high resolution capability, but as stated previously, access to such facilities is limited. Benchtop systems may not provide the room needed for complex optical arrangements, and they generally do not provide spectrally wide X-ray sources that can be used to analyze all of the materials in a chemically diverse sample simultaneously.

To this end, and according to an embodiment of the present disclosure, a nanofabricated target structure is positioned between a primary particle beam source and a sample specimen to be imaged. Selected materials are disposed on one surface of the target structure (or substrate) which faces the primary beam source. These materials are referred to as nanostructures since they generally have sub-micron diameters, and the process of disposing these materials on the target structure is referred to as nanofabricating or nanopatterning.

Due to various interactions with particles (electrons, X-rays or low atomic number ions) in the primary beam, the nanostructures emit secondary X-ray radiation consisting of (i) characteristic X-rays with known energies unique to the element composition of the nanostructures and the incident energy of the primary particles, and (ii) other types of X-rays such as Bremsstrahlung for the case of incident electrons. In general, the primary particles interact not only with the nanostructures, but also with the target substrate and potentially with the imaged sample. In the case of incident electrons, there may be multiple scattering events in the forward and backward directions; after having propagated through the nanostructure, an electron may backscatter into the material again and generate another X-ray. In the case of incident photons, an additional fluorescence event may occur, in which a photon generates a new photon either in the nanostructure or externally to the nanostructure. That X-ray may subsequently undergo additional photon-generating processes within the nanomaterial.

Regardless of the photon-generating history, however, characteristic X-rays with a priori known energies are generated in the nanostructure volume, and, provided that each lateral dimension of the volume is smaller than the primary beam diameter, so-called sub-beam resolution may be achieved. These X-rays can be used to improve resolution in tomographic imaging, if the measurement system is energy-sensitive such that detected characteristic X-rays may be associated with a "focal spot" corresponding to a nanostructure volume. Continuum X-rays such as Bremsstrahlung, and any scattering event that does not correspond to characteristic fluorescence from target materials, cannot be used to achieve sub-beam resolution, as these X-rays can originate from any point within the target/sample assembly. An energy sensitive detector may be used to discriminate these X-rays from characteristic X-rays arising from within the nanostructures.

Characteristic X-rays generated from the target nanostructures propagate through the sample to be imaged, and the energy sensitive detector can be used to either perform individual photon counting or acquire intensity measurements as a function of photon energy. In some embodiments, given an initial source model, a description of the photon interaction physics with the sample, and a suitable inversion or tomographic formalism, the properties of the sample can be deduced at high resolution from the measurements, as will be described in greater detail below.

The increased imaging resolution provided by embodiments of the present disclosure can be employed at incident particle energy levels and particle flux levels that are non-destructive to the nanostructures and sample. Particularly for the case of "benchtop sources" or "weak sources," a detector displaying high signal-to-noise ratio capability, or a statistical tomographic processing system well-suited to low signal levels, has the potential to accommodate low incident particle flux.

The disclosed techniques can be used in a wide variety of applications including, for example, quantifying IC feature variability for quality control, identifying IC counterfeiting to deter intellectual property theft, detecting presence of malware introduced into ICs manufactured by third parties, and IC failure analysis. Other applications include inspection of microelectromechanical systems (MEMS), welding joints, additively-manufactured parts, grain structure and defects in materials, in-situ material growth under variable conditions, and structural evolution of in-operando nano-scaled devices.

In accordance with an embodiment, a methodology to implement these techniques includes providing a primary particle beam to illuminate materials nanopatterned on a first surface of a target structure, hereinafter referred to as a target structure or just target. The target structure may also be referred to as a planar structure since the width and height dimensions of the target surfaces are typically much greater than the thickness of the target. The first surface of the target is a material distinct from the selected disposed materials. The illuminated volume encompasses two or more selected materials nanofabricated on a first surface of the target structure, such that the two or more selected materials generate X-ray photons in response to the primary particle (photon, electron or low atomic number ion) beam.

The methodology further includes detecting, for example using a spectral energy detector (SED) or energy-dispersive X-ray (EDX) detector, individual photons or intensity levels implicitly containing X-ray information on the sample specimen to be imaged due to sample interactions. In one embodiment, the data is processed to infer attenuation contrast in the sample at the given energy of the characteristic X-rays. Multiple attenuation contrast images may be generated, each corresponding to the given characteristic X-rays. In one embodiment, X-ray photon counts from different energies (different characteristic X-rays) are inverted jointly for an element density model.

The sample is positioned both adjacent to the second surface (opposite the first surface) of the planar target structure, and between the planar target structure and the SED. In some embodiments, a spacer may be positioned between the target structure and the sample, the spacer fabricated from a material with a low attenuation composition (e.g., aluminum). In another embodiment, there may be an air-gap between the target structure and the sample. The focal spot size of the characteristic fluorescent X-rays in the nanostructures are substantially related to the area and depth of the selected materials that generate these photons, and the area is generally smaller than the footprint of the primary particle beam.

It will be appreciated that the techniques described herein may provide improved imaging resolution, compared to other possible techniques, such as those that use imaging beams with relatively large diameter beamwidths or imaging beams generated at power levels that can destroy the sample being imaged. Other applications will be apparent.

System Architecture

FIG. 1 provides a top-level illustration of an imaging system 100 employing a nanofabricated target structure, configured in accordance with certain embodiments of the present disclosure. The imaging system is configured to provide sub-beam imaging resolution and spectral enhancement through the use of multi-material nanofabricated target structures. As shown, a primary imaging beam source 160 is configured to generate a primary imaging beam that illuminates the target structure 130. In some embodiments, the primary beam may be an X-ray beam, an electron beam, or a low atomic number ion beam. The sample to be imaged 140 is positioned behind the target 130, for example on a fixture 120. As will be described in greater detail below, nanostructures disposed on the surface of the target 130 generate characteristic X-rays in response to the primary beam. These secondary X-rays emanate from a lateral area smaller than the primary beam footprint, thus imaging resolution is limited by the size of the nanostructures rather than the size of the incident primary beam spot. The secondary X-rays pass through the sample 140 and are detected by spectral energy detector 150. The measured photon count at a given characteristic X-ray energy may then be used to construct an image of the sample 140. In some embodiments, multiple data sets may be obtained, for example as the sample and the target undergo rotation and/or translation, and these multiple data sets may be tomographically processed 110 to provide a detailed three-dimensional view of the sample 140.

In one embodiment, no rotations are performed, and instead a projection image is obtained using a single nanomaterial "point source" in which an image is formed on a detector pixel array. In another embodiment, no rotations are performed, and instead a projection image is obtained using a single nanomaterial "point source" in which a single detector pixel is translated to a new location to collect another measurement; after the conclusion of a suitable raster scan in two-dimensions using such translations, a projection image may be constructed. This corresponds to "synthetic aperture" as opposed to "real aperture," and the projection image (for a single characteristic energy) reveals, in essence, an attenuation measurement of the sample.

Figure 2:
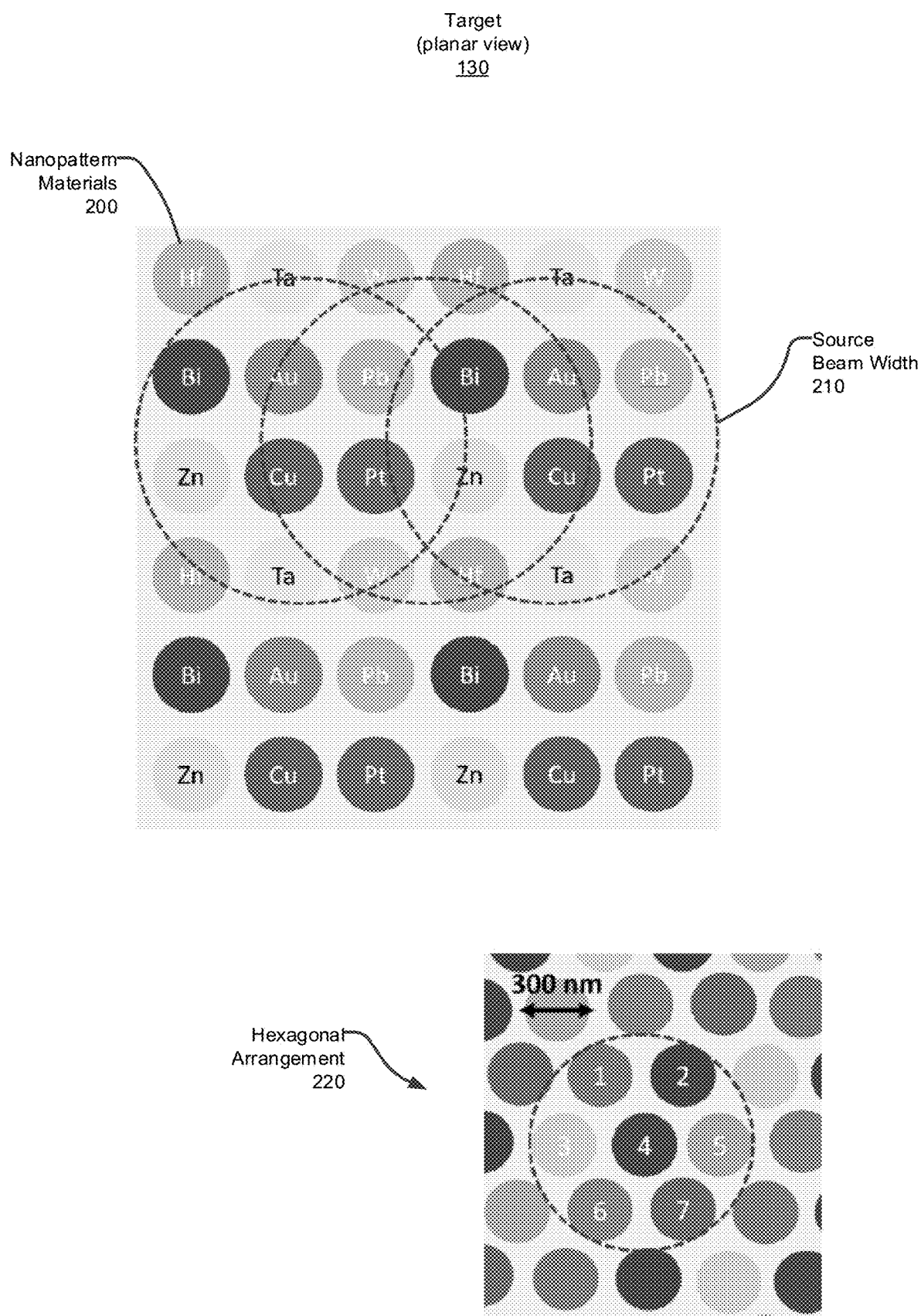
FIG. 2 illustrates a planar view of the nanofabricated target structure, configured in accordance with certain embodiments of the present disclosure.

FIG. 2 illustrates a planar view of the nanofabricated target structure 130, configured in accordance with certain embodiments of the present disclosure. The surface of the target structure 130 facing the primary beam source 160 is shown. Nanostructures 200 are fabricated on the surface in a selected pattern as illustrated. The nanostructures may be cylindrical or cuboids, though other volumetric shapes are possible. In some embodiments, the nanostructures may be composed of any one or more of various materials such as hafnium (Hf), tantalum (Ta), tungsten (W), bismuth (Bi), gold (Au), lead (Pb), zinc (Zn), copper (Cu), germanium (Ge), titanium (Ti), chromium (Cr), nickel (Ni), and platinum (Pt). The materials are selected to accommodate the primary beam energy as well as the gamut of absorption edges in the sample. The source beamwidth 210 (footprint or profile) is illustrated by the circular dotted line and is shown to encompass several (e.g., 9) of the nanopatterned materials 200, in each of three instances of target illumination. An alternate hexagonal pattern/arrangement 220 of the materials is also shown, as may be used in some embodiments. This pattern may advantageously allow the primary source beam width to fully cover a pre-selected number (e.g., 7) of nanostructures without partially impinging on neighboring materials. This allows for correctly associating a detector measurement with the location of the nanostructures that gave rise to that data. In this illustration, the nanopatterned materials are shown to be circular with a diameter of 300 nanometers.

The nanostructures can be patterned directly onto an X-ray-transparent substrate or thin (<200 nm) membrane of, for example, diamond or silicon nitride. Optionally, as a means of promoting charge and thermal dissipation, the nanostructures can be fabricated on thin films of metal such as gold or aluminum that have been deposited on top of these membranes. For additional structural support and increased charge and thermal dissipation in the case of a high-powered beam, the structures can be embedded inside of an X-ray transparent substrate such as graphite or diamond such that the targets are completely surrounded. In some such embodiments, voids may be created inside of the substrate, into which the target materials can be deposited.

Figure 3:
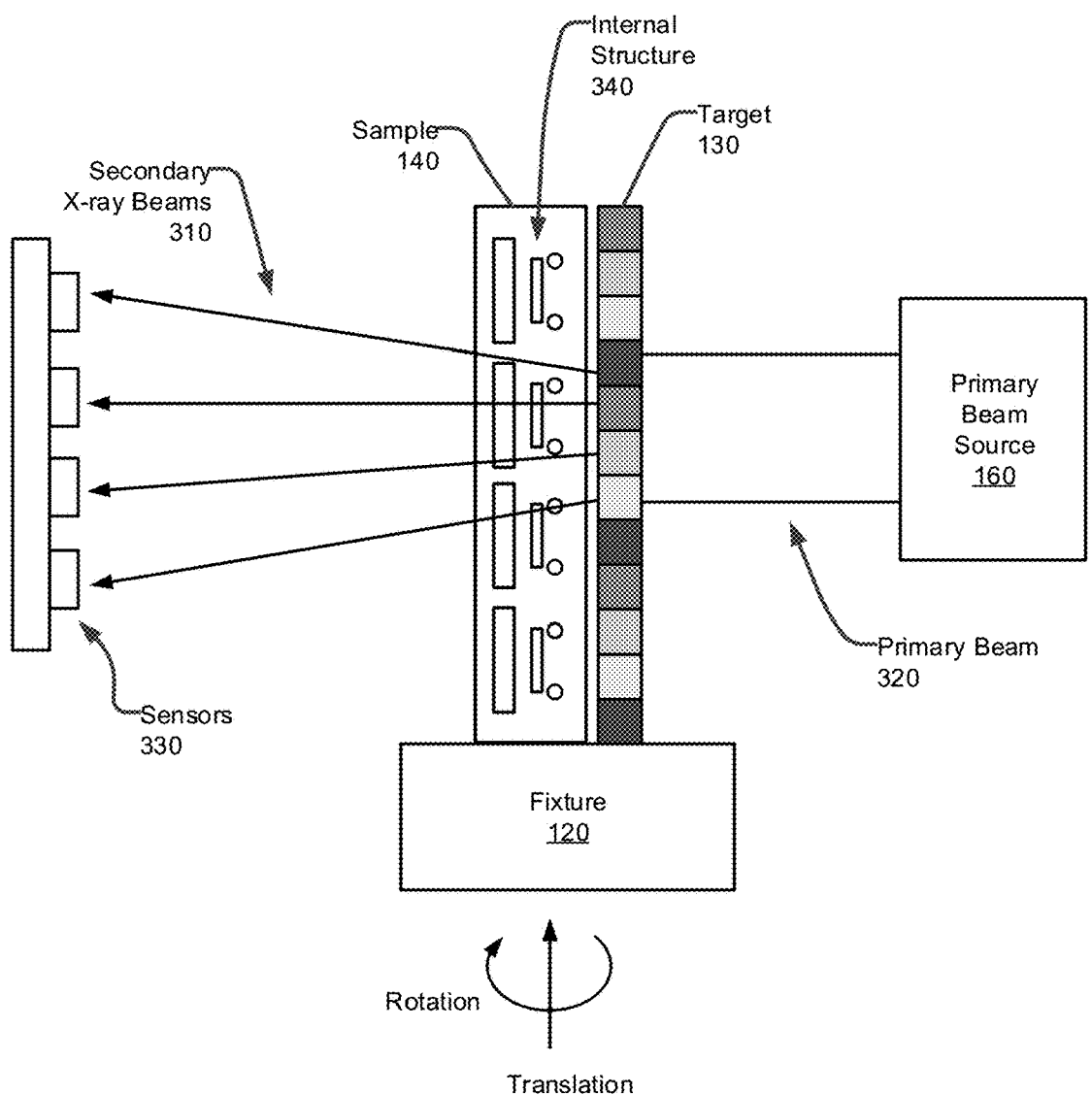
FIG. 3 is a more detailed illustration of the imaging system employing a nanofabricated target structure, configured in accordance with certain embodiments of the present disclosure.

FIG. 3 is a more detailed illustration 300 of the imaging system employing a nanofabricated target structure, configured in accordance with certain embodiments of the present disclosure. The primary beam source 160 is shown to generate the primary beam 320, which illuminates several of the nanopatterned materials of target 130, as shown in a cross-sectional side view. Each of the nanopatterned materials generates X-rays 310 that emit isotropically in response to the primary beam 320. Beam 320 may be a focused beam of electrons originating from a benchtop electron column (i.e., SEM), or a focused beam of photons generated, for example at a synchrotron, and filtered and focused using X-ray optics. The beam may also comprise low atomic number ions (i.e., protons), although damage to the nanostructures over time is more likely with these particles. Each of the X-ray photon 310 energies and flux levels are determined by the composition of the nanostructures, by the primary beam 320 particle type, and by the energy of those incident particles. Nanostructure volume also determines photon flux levels.

The characteristic X-rays 310 pass through the sample 140 and are affected (e.g., attenuated) to varying degrees by the internal structure 340 of the sample. Sensors 330 of spectral energy detector 150 are configured to detect these X-rays after passage through the sample 140. The detected photons may be spatially attributed to known source locations by virtue of the correspondence between their measured energies and the known characteristic spectral lines produced by each target material. An image may thus be formed based on the signals generated by each sensor. Stated differently, each sensor may be considered to represent a pixel of a composite image representing the internal structure of the sample 140.

In some embodiments, rather than creating a 2D projection image, the measured data may be tomographically processed for construction of a 3D image of the sample, particularly if the data collection protocol provides data with the necessary sensitivity to the 3D sample structure. Typically, this involves translating the target/sample assembly with respect to the beam for "dwell periods" and data collections at various locations, and doing so for various rotation angles of the assembly. Alternatively, a large flat panel array of detector pixels, or a hemispherical distribution of detector pixels may be used to either reduce or eliminate the need for multiple target/sample rotations and data collections.

In some embodiments, the sensors 330 may provide high spectral resolution for distinguishing the energies of the fluorescent X-rays emitted by the various nanomaterials. In essence, a 2D pixel array coverage yields a 3D data set, the third dimension being energy. Additionally, measurement of detected X-rays may be used to identify the chemical composition of structures in the sample by joint inversion of that data for constituent element density in the sample, as the differential attenuations of each characteristic X-ray line varies according to the materials it interrogates. Taken together, they provide a constraint on the possible material composition of the sample, rather than an attenuation contrast image at a single energy.

The sample 140 and target 130 are shown to be mounted on a fixture 120 of any suitable type. In some embodiments, the fixture is configured to provide rotational and/or translational motion to the sample and target combination. Multiple images of the sample may thus be obtained from varying viewpoints and these images may be processed tomographically to provide a detailed three-dimensional estimation of the sample. Additionally, as numerous, distinct, characteristic X-ray energies are generated from the several target nanostructures simultaneously, and each distinct X-ray energy interacts uniquely with the sample, complementary yet independent information is provided for volume reconstruction. This process may adopt numerous forms, and in one embodiment is known as "spectral computed tomography." In general, any suitable tomographic inversion algorithm may be employed to reconstruct a 3D image based on the measured X-ray interactions with the sample as collected over a multiplicity of dwell locations and target/sample rotation angles.

In some embodiments, the SED 150 may be translated and/or rotated instead of (or in addition to) the fixture 120, as an alternative technique for obtaining varying viewing angles for tomographic processing.

Figure 4:
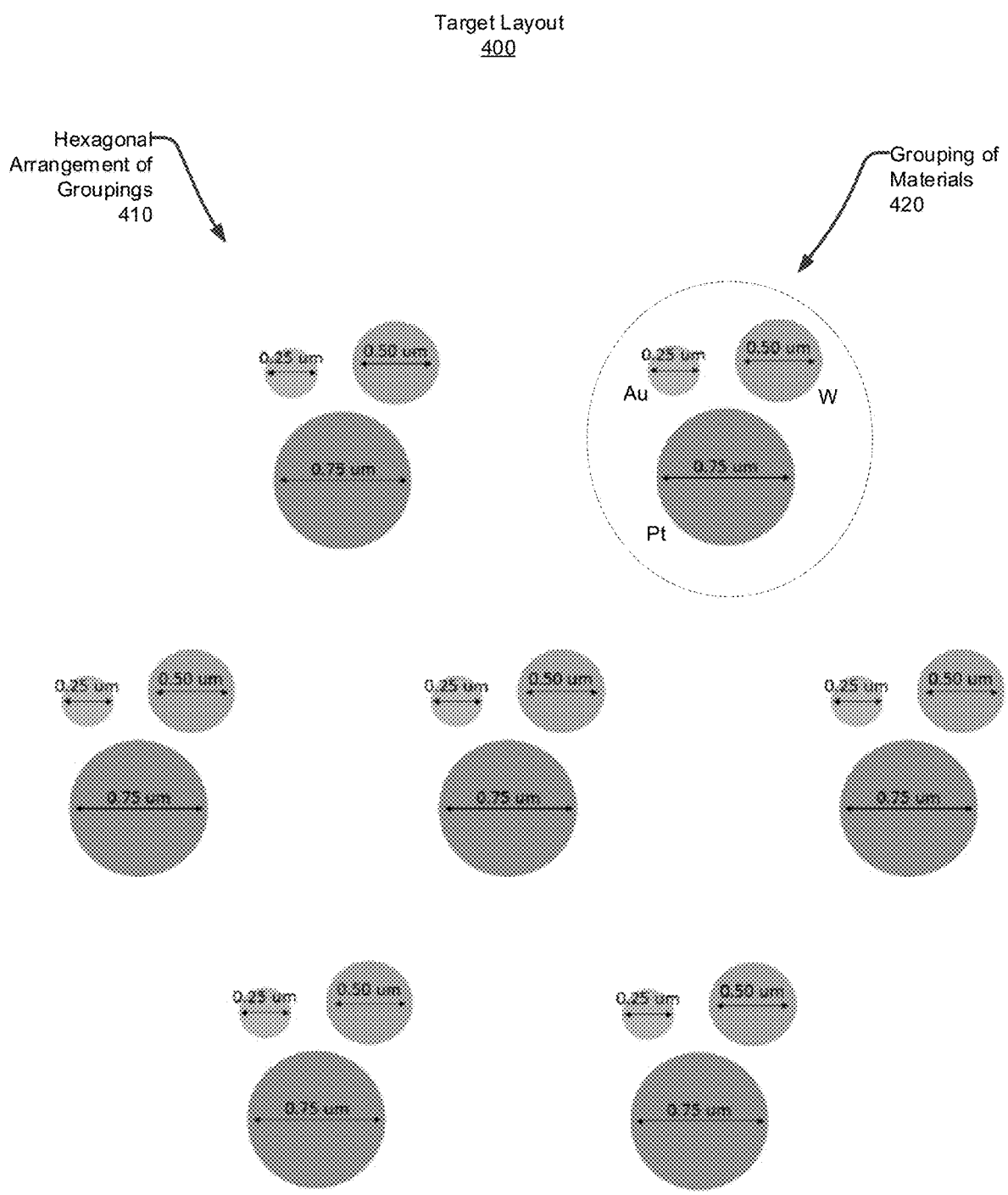
FIG. 4 illustrates dimensions and arrangement of the nanostructures disposed on the fabricated target structure, in accordance with certain embodiments of the present disclosure.

FIG. 4 illustrates example dimensions and arrangement 400 of nanostructures disposed on a target structure, in accordance with certain embodiments of the present disclosure. In this example, three materials (gold, platinum and tungsten) are patterned in groupings 420. The groupings are arranged in a hexagonal pattern 410 on the target structure. The spacing between groupings is chosen to accommodate the width of the primary beam such that neighboring groupings of nanostructures are not simultaneously illuminated. The gold, platinum and tungsten structures have diameters of 250 nm, 750 nm and 500 nm, respectively. As photon flux levels vary as a function of the material for a given primary beam energy, diameters are chosen such that all three materials achieve similar total photon counts over a chosen dwell time.

Figure 5:
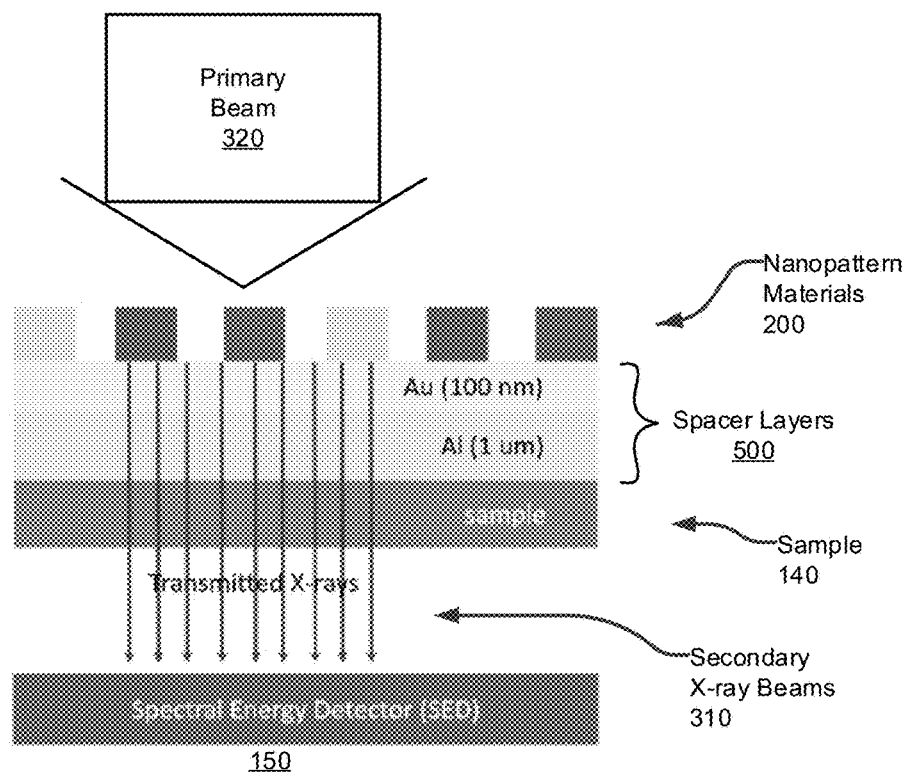
FIG. 5 illustrates the use of spacers and stacked nanomaterials, in accordance with certain embodiments of the present disclosure.
Figure 5:
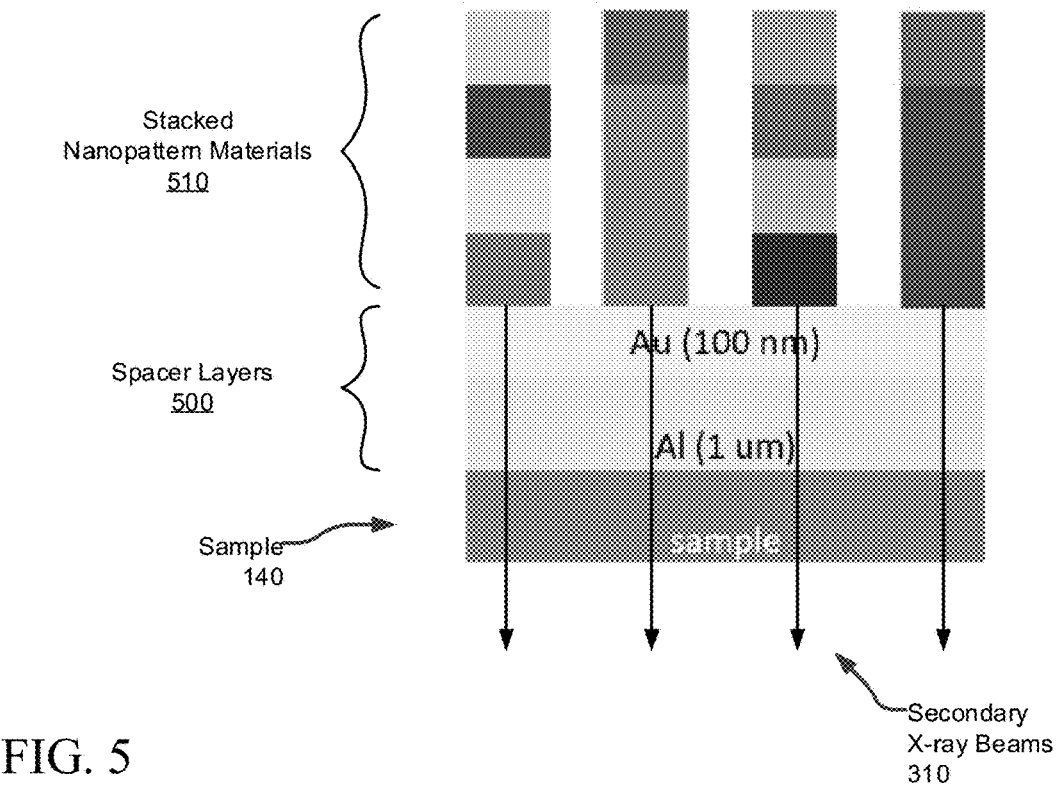

FIG. 5 illustrates the use of spacers and stacked nanomaterials, in accordance with certain embodiments of the present disclosure. Spacer layers 500 are shown to be interposed between the nanopatterned materials 200 and the sample 140. Two spacer layers are shown. The first spacer layer is a layer of gold approximately 100 nm thick. The second spacer layer is a layer of aluminum approximately 1 micron thick. In some embodiments, the spacer layers are employed to dissipate heat and to mitigate or prevent charge buildup on the sample (for example, as may occur with non-conducting sample materials). In some embodiments, the spacer layers are employed to introduce a magnification factor by allowing the isotropically emitted fluorescent X-rays in the nanostructures to spread out or widen before reaching the sample. This provides an alternative approach to setting the imaging resolution (in addition to controlling the area of the deposited nanomaterials). In one embodiment, the first spacer layer may be viewed as a target layer. This layer in FIG. 5 is the 100 nm Au layer. Fluorescent emissions from that layer may also be used for tomographic processing.

In some embodiments, the nanopatterned materials may be configured in a stacked arrangement, as shown at 510, such that the secondary X-ray beams 310 comprise a combination of energies emitted by the materials in each stack. This technique can impart a highly spectrally diverse X-ray source depending on the materials selection as well as the particle type and energy of the primary source beam. In such a case, the imaging magnification factor for each collected image associated with a different material would be slightly different, as the distance between the target material and imaging sample varies with position in the stack.

Figure 6:
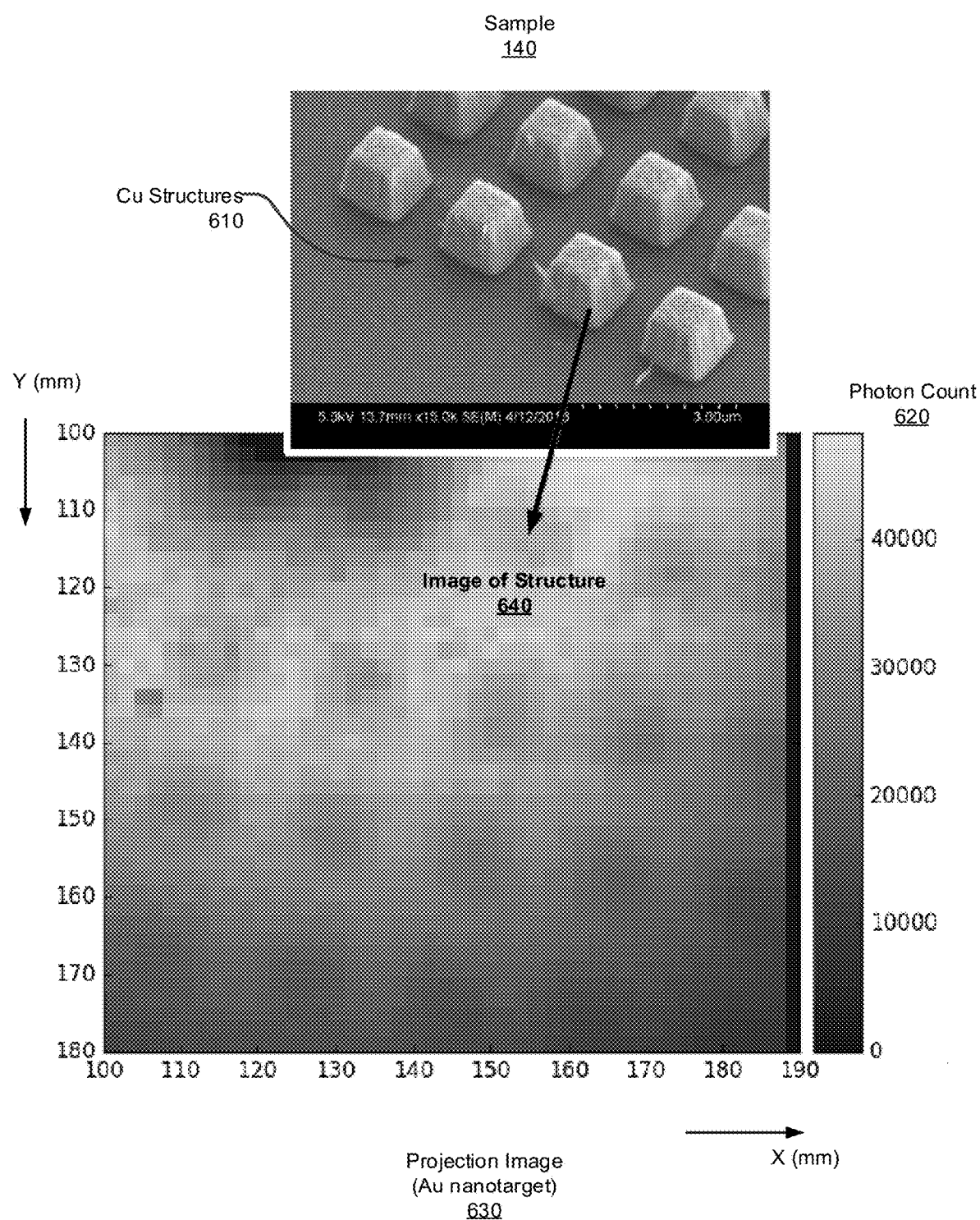
FIG. 6 illustrates image processing results from an imaging system employing a nanofabricated target structure, configured in accordance with certain embodiments of the present disclosure.

FIG. 6 illustrates image processing results from an imaging system employing a nanofabricated target structure, configured in accordance with certain embodiments of the present disclosure. The sample being imaged 140, is shown to be an array of copper (Cu) structures 610, each approximately 1 micron by 1 micron laterally and 1 micron in height. The primary beam used in this example projects a 2 micron diameter spot, and is thus wider than the structural features of interest in the sample 140.

The target nanostructures used in this example are gold (Au) cylinders with 500 nm diameter and 1 micron height patterned on a 100 nm thick silicon nitride membrane. A projected image of the Cu structures resulting from Au characteristic X-ray attenuation through the sample is shown as a map 630, with axes in millimeters (mm). The variable attenuation of X-rays is represented here as detected photon count 620 coded by the color scale on the right-hand side of the image.

As shown, the imaging system provides a magnification factor as the characteristic Au X-rays project outward from the sample 140 to the detector 150. In this example, a magnification factor of 10,000 is achieved, wherein the imaged structures are approximately 10 mm wide, while the sample structures are approximately 1 micron wide.

Methodology

Figure 7:
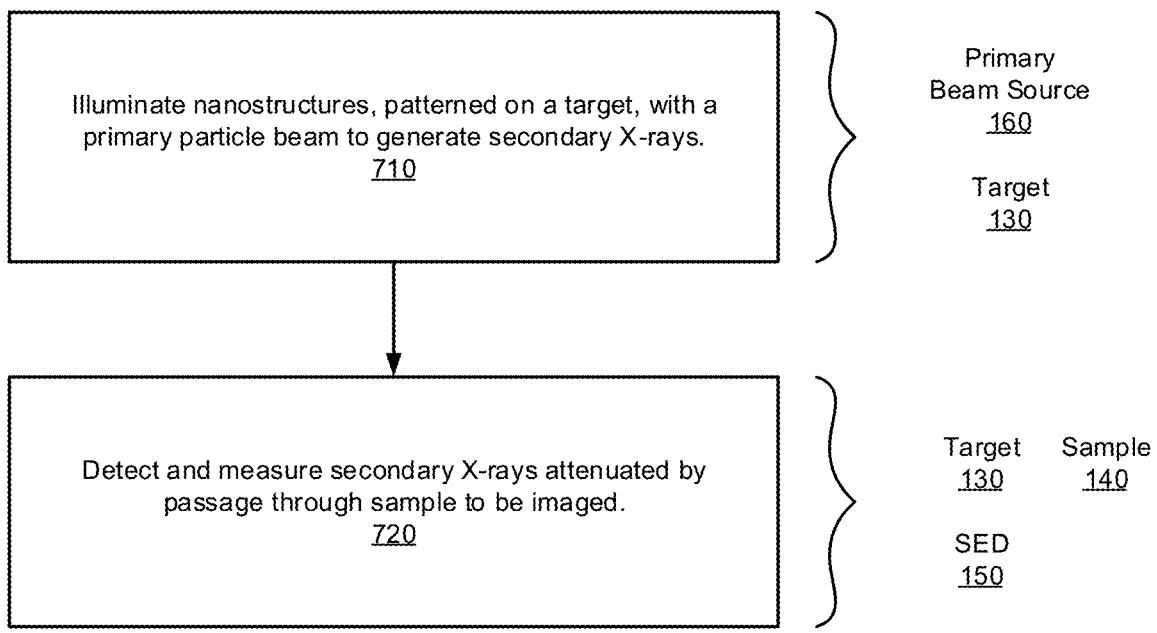
FIG. 7 is a flowchart illustrating a methodology for imaging using the nanofabricated target structure, in accordance with another embodiment of the present disclosure.

FIG. 7 is a flowchart illustrating a methodology for imaging using the nanofabricated target structure, in accordance with another embodiment of the present disclosure. As can be seen, example method 700 includes a number of phases and sub-processes, the sequence of which may vary from one embodiment to another. However, when considered in aggregate, these phases and sub-processes form a process for imaging with sub-beam resolution and with multiple X-ray energies, in accordance with certain of the embodiments disclosed herein. These embodiments can be implemented, for example using the system architecture illustrated in FIGS. 1-5, as described above. However other system architectures can be used in other embodiments, as will be apparent in light of this disclosure. To this end, the correlation of the various functions shown in FIG. 7 to the specific components illustrated in FIGS. 1-5 is not intended to imply any structural and/or use limitations. Rather other embodiments may include, for example, varying degrees of integration wherein multiple functionalities are effectively performed by one system. Numerous variations and alternative configurations will be apparent in light of this disclosure.

As illustrated in FIG. 7, in one embodiment method 700 commences, at operation 710, by providing a primary particle beam (e.g., photon, electron, or ion beam) to illuminate nanostructures patterned on a first surface of the target structure. The primary particle beam causes one or more selected materials to generate secondary (or characteristic) X-rays that isotropically propagate from the nanostructures. These secondary X-rays have characteristic energies that are based on properties of the nanostructure materials. The secondary X-rays originate from a spot with a width approximately equal in size to the selected nanostructures, which are chosen to be smaller than the primary beam width, thus enabling higher resolution imaging (when coupled with an appropriate energy-sensitive X-ray detector).

Next, at operation 720, a spectral energy detector (SED) detects and measures the secondary X-rays which are attenuated by propagation through a sample to be imaged. The SED performs photon counting within energy bins of some given spectral resolution. When compared to the expected source flux, a constraint on the attenuation structure of the sample is obtained. The sample is positioned both adjacent to the second surface of the planar target structure (opposite the first surface) and between the planar target structure and the SED.

Of course, in some embodiments, additional operations may be performed, as previously described in connection with the system. These additional operations may include, for example, rotating and/or translating the target structure and the sample, relative to the source of the primary particle beam, to provide tomographic imaging capability. In some embodiments, the selected materials may include, but are not limited to, for example, hafnium, tantalum, tungsten, bismuth, gold, lead, zinc, copper, germanium, titanium, chromium, nickel, or platinum. In some embodiments, the diameters of the select materials, as disposed on the target, are in the submicron range.

Example Platforms

Figure 8:
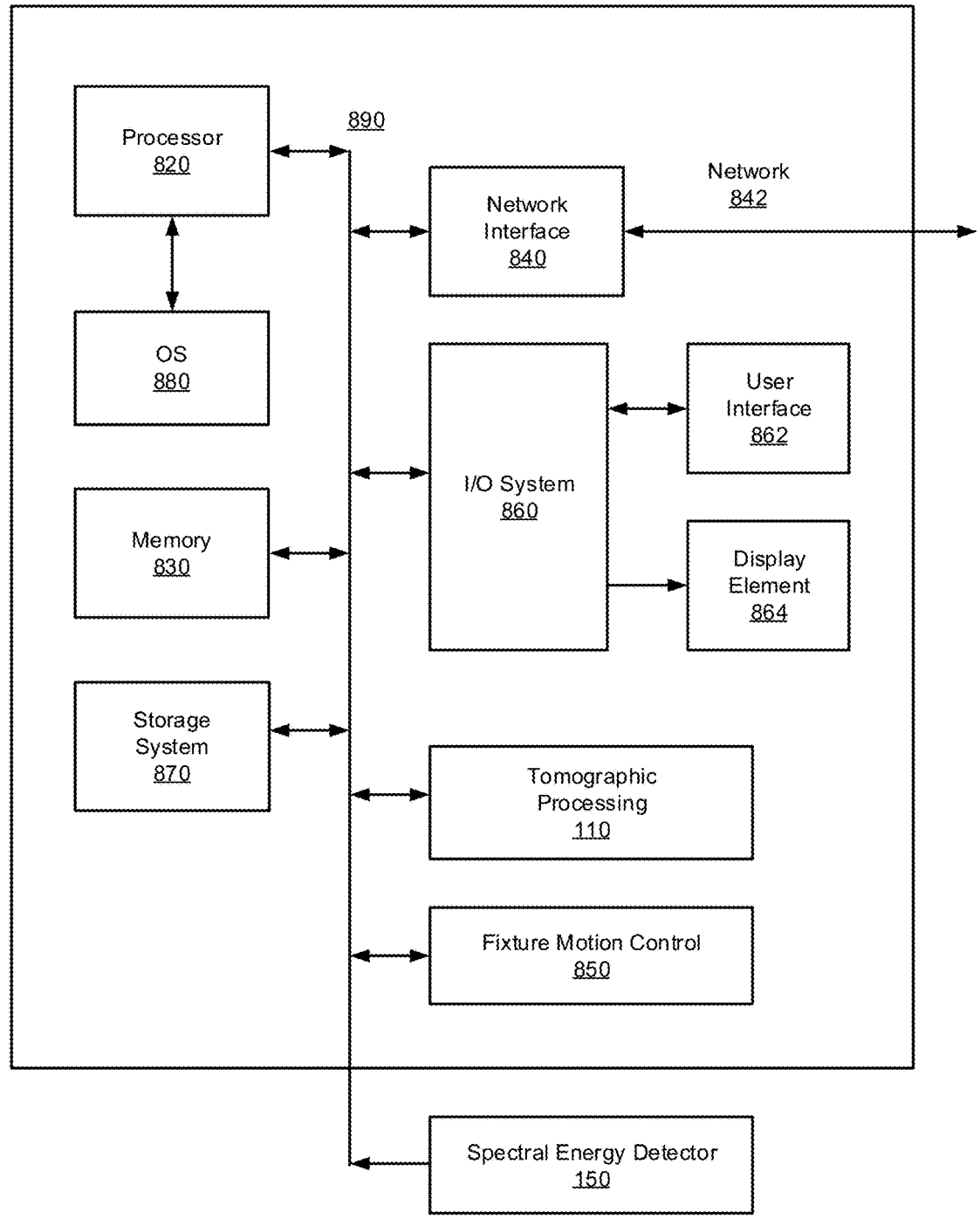
FIG. 8 is a block diagram schematically illustrating a platform employing the disclosed imaging techniques, in accordance with certain embodiments of the present disclosure.

FIG. 8 is a block diagram schematically illustrating a platform 800 employing the disclosed imaging techniques, in accordance with certain embodiments of the present disclosure. In some embodiments, platform 810 may be hosted on, or otherwise be incorporated into or any other suitable platform or application.

In some embodiments, platform 810 may comprise any combination of a processor 820, a memory 830, an input/output (I/O) system 860, a user interface 862, a display element 864, a storage system 870, a network interface 840, tomographic processing system 110, and fixture motion control system 850. Platform 800 may be coupled to spectral energy detector 150 to receive detected signals for processing, for example by tomographic processing system 110. As can be further seen, a bus and/or interconnect 890 is also provided to allow for communication between the various components listed above and/or other components not shown. Platform 800 can be coupled to a network 842 through network interface 840 to allow for communications with other computing devices, platforms, devices to be controlled, or other resources. Other componentry and functionality not reflected in the block diagram of FIG. 8 will be apparent in light of this disclosure, and it will be appreciated that other embodiments are not limited to any particular hardware configuration.

Processor 820 can be any suitable processor, and may include one or more coprocessors or controllers, such as an audio processor, a graphics processing unit, or hardware accelerator, to assist in control and processing operations associated with platform 800. In some embodiments, the processor 820 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 820 may be implemented as a complex instruction set computer (CISC) or a reduced instruction set computer (RISC) processor.

Memory 830 can be implemented using any suitable type of digital storage including, for example, flash memory and/or random-access memory (RAM). In some embodiments, the memory 830 may include various layers of memory hierarchy and/or memory caches as are known to those of skill in the art. Memory 830 may be implemented as a volatile memory device such as, but not limited to, a RAM, dynamic RAM (DRAM), or static RAM (SRAM) device. Storage system 870 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 820 may be configured to execute an Operating System (OS) 880 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with platform 800, and therefore may also be implemented using any suitable existing or subsequently-developed platform.

Network interface circuit 840 can be any appropriate network chip or chipset which allows for wired and/or wireless connection between other components of device platform 800 and/or network 842, thereby enabling platform 800 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 860 may be configured to interface between various I/O devices and other components of platform 800. I/O devices may include, but not be limited to, user interface 862 and display element 864. User interface 862 may include other devices (not shown) such as a touchpad, keyboard, mouse, microphone and speaker, trackball or scratch pad, and camera. I/O system 860 may include a graphics subsystem configured to perform processing of images for rendering on the display element 864. These images may be provided by tomographic processing system 110. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 820 or any chipset of platform 800.

It will be appreciated that in some embodiments, some of the various components of platform 800 may be combined or integrated in a system-on-a-chip (SoC) architecture. In some embodiments, the components may be hardware components, firmware components, software components or any suitable combination of hardware, firmware or software.

Tomographic processing system 110 is configured to generate relatively high resolution 3-dimensional images of the sample object 140, based on measured photon counts and energies, using the imaging system 100, employing a nanofabricated target structure, as described previously. Imaging system 100 may include any or all of the components illustrated in FIGS. 1-5 as described above. These components can be implemented or otherwise used in conjunction with a variety of suitable hardware that is coupled to or that otherwise forms a part of platform 800. The target nanostructures enable sub-beam resolution, but ultimate imaging resolution also depends on a number of factors including X-ray sensitivity (contrast) to the materials in the sample under study, geometric diversity of X-ray sampling of the structure as defined, at least, by (i) spatial distribution of beam probe locations with respect to the target/sample assembly, (ii) rotation angle(s) of the target/sample assembly with respect to the probe beam optical axis, (iii) number and spatial distribution of detector pixels used in the transmission X-ray measurement, (iv) distance of detector pixels from the target/sample assembly, (v) absolute number of photon counts of the imaging X-rays (which determines data variance), (vi) detected signal-to-noise ratio, and (vii) the optimization procedure used in the tomographic inversion (including the selection of regularization or model priors).

Various embodiments of platform 800 may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, causes one or more of the methodologies disclosed herein (for example, tomographic image processing of the detected spectral energy) to be implemented. Other componentry and functionality not reflected in the illustrations will be apparent in light of this disclosure, and it will be appreciated that other embodiments are not limited to any particular hardware or software configuration. Thus, in other embodiments platform 800 may comprise additional, fewer, or alternative subcomponents as compared to those included in the example embodiment of FIG. 8.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). In some embodiments, the hardware may be modeled or developed using hardware description languages such as, for example Verilog or VHDL. Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "estimating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, or one or more embedded routines configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads or parallel processes in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), computers, and other processor-based or functional systems. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

One example embodiment of the present disclosure provides an imaging system comprising: a target structure comprising a first surface and a second surface, the second surface opposite the first surface; one or more materials disposed on the first surface of the target structure; a primary particle beam source to provide a particle flux incident on an area of the first surface of the target structure, the area encompassing one or more of the materials, such that the one or more materials generate secondary X-rays of characteristic energies in response to the particle flux, the characteristic energies based on properties of the materials; and a spectral energy detector (SED) to detect and measure the secondary X-rays, wherein the secondary X-rays are attenuated by propagation through a sample to be imaged, the sample positioned both adjacent to the second surface of the target structure and between the target structure and the SED.

In some cases, the particle flux comprises one of electrons, photons, and ions. In some cases, the area upon which the particle flux is incident is of a first diameter, focal spots of the secondary X-rays are of one or more additional diameters related to diameters of the materials, and the first diameter is greater than the one or more additional diameters. In some such cases, the secondary X-rays provide an imaging resolution related to the one or more additional diameters. In some such cases, the one or more additional diameters are less than or equal to one micron. In some cases, the secondary X-rays propagate isotropically from the materials. In some cases, the materials include at least one of hafnium, tantalum, tungsten, bismuth, gold, lead, zinc, copper, germanium, titanium, chromium, nickel, and platinum. In some cases, the characteristic energies are unique to the materials. In some cases, the materials are disposed on the first surface of the target structure in a hexagonal pattern. In some cases, the system further comprises a fixture to secure the target structure and the sample, and to rotate and/or translate the target structure and sample relative to the primary particle beam source to provide tomographic imaging capability.

Another example embodiment of the present disclosure provides a method for imaging, the method comprising: providing a primary particle beam to illuminate an area of a first surface of a target structure, the area encompassing one or more materials disposed on the first surface of the target structure, such that the one or more materials generate secondary X-rays in response to the primary particle beam; and detecting, by a spectral energy detector (SED), attenuation of the secondary X-rays, wherein the secondary X-rays are attenuated by passage through a sample to be imaged, the sample positioned both adjacent to a second surface of the target structure and between the target structure and the SED. In some cases, the primary particle beam comprises one of electrons, photons, and ions. In some cases, the primary particle beam is of a first diameter, focal spots of the secondary X-rays are of one or more additional diameters related to diameters of the materials, and the first diameter is greater than the one or more additional diameters. In some such cases, the secondary X-rays provide an imaging resolution related to the one or more additional diameters. In some such cases, the one or more additional diameters are less than or equal to one micron. In some cases, the secondary X-rays propagate isotropically from the materials. In some cases, the materials include at least one of hafnium, tantalum, tungsten, bismuth, gold, lead, zinc, copper, germanium, titanium, chromium, nickel, and platinum. In some cases, the characteristic energies are unique to the materials. In some cases, the materials are disposed on the first surface of the target structure in a hexagonal pattern. In some cases, the system further comprises rotating and/or translating the target structure and the sample, relative to a source of the primary particle beam, to provide tomographic imaging capability.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. An imaging system comprising:
    a target structure comprising a first surface and a second surface, the second surface opposite the first surface;
    one or more materials disposed on the first surface of the target structure;
    a primary particle beam source to provide a particle flux incident on an area of the first surface of the target structure, the area encompassing the one or more materials, such that the one or more materials generate secondary X-rays of characteristic energies in response to the particle flux, the characteristic energies based on properties of the materials; and
    a spectral energy detector (SED) to detect and measure the secondary X-rays, wherein the secondary X-rays are attenuated by propagation through a sample to be imaged, the sample positioned both adjacent to the second surface of the target structure and between the target structure and the SED.

2. The system of claim 1, wherein the particle flux comprises one of electrons, photons, and ions.

3. The system of claim 1, wherein the area upon which the particle flux is incident is of a first diameter, focal spots of the secondary X-rays are of one or more additional diameters related to diameters of the materials, and the first diameter is greater than the one or more additional diameters.

4. The system of claim 3, wherein the secondary X-rays provide an imaging resolution related to the one or more additional diameters.

5. The system of claim 3, wherein the one or more additional diameters are less than or equal to one micron.

6. The system of claim 1, wherein the secondary X-rays propagate isotropically from the materials.

7. The system of claim 1, wherein the materials include at least one of hafnium, tantalum, tungsten, bismuth, gold, lead, zinc, copper, germanium, titanium, chromium, nickel, and platinum.

8. The system of claim 1, wherein the characteristic energies are unique to the materials.

9. The system of claim 1, further comprising a plurality of sensors on the spectral energy detector, wherein an image of the sample is formed based on signals generated by the sensors detecting the secondary X-rays.

10. The system of claim 1, further comprising a fixture to secure the target structure and the sample, and to rotate and/or translate the target structure and sample relative to the primary particle beam source to provide tomographic imaging capability.

11. A method for imaging, the method comprising:
    providing a primary particle beam to illuminate an area of a first surface of a target structure, the area encompassing one or more materials disposed on the first surface of the target structure, such that the one or more materials generate secondary X-rays of characteristic energies in response to the primary particle beam; and
    detecting, by a spectral energy detector (SED), attenuation of the secondary X-rays, wherein the secondary X-rays are attenuated by passage through a sample to be imaged, the sample positioned both adjacent to a second surface of the target structure and between the target structure and the SED.

12. The method of claim 11, wherein the primary particle beam comprises one of electrons, photons, and ions.

13. The method of claim 11, wherein the primary particle beam is of a first diameter, focal spots of the secondary X-rays are of one or more additional diameters related to diameters of the materials, and the first diameter is greater than the one or more additional diameters.

14. The method of claim 13, wherein the secondary X-rays provide an imaging resolution related to the one or more additional diameters.

15. The method of claim 13, wherein the one or more additional diameters are less than or equal to one micron.

16. The method of claim 11, wherein the secondary X-rays propagate isotropically from the materials.

17. The method of claim 11, wherein the materials include at least one of hafnium, tantalum, tungsten, bismuth, gold, lead, zinc, copper, germanium, titanium, chromium, nickel, and platinum.

18. The method of claim 11, wherein the characteristic energies are unique to the materials.

19. The method of claim 11, wherein the materials are disposed on the first surface of the target structure in a hexagonal pattern.

20. The method of claim 11, further comprising rotating and/or translating the target structure and the sample, relative to a source of the primary particle beam, to provide tomographic imaging capability.

* * * * *